US011086326B2

(12) United States Patent
Maruyama et al.

(10) Patent No.: US 11,086,326 B2
(45) Date of Patent: Aug. 10, 2021

(54) MOVING OBJECT CONTROLLER AND MOVING OBJECT CONTROL METHOD

(71) Applicant: Hitachi, Ltd., Tokyo (JP)

(72) Inventors: Nahoko Maruyama, Tokyo (JP); Yoichi Iihoshi, Tokyo (JP); Junya Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 190 days.

(21) Appl. No.: 16/468,004

(22) PCT Filed: Jan. 16, 2017

(86) PCT No.: PCT/JP2017/001174
§ 371 (c)(1),
(2) Date: Jun. 10, 2019

(87) PCT Pub. No.: WO2018/131153
PCT Pub. Date: Jul. 19, 2018

(65) Prior Publication Data
US 2019/0384299 A1 Dec. 19, 2019

(51) Int. Cl.
G05D 1/02 (2020.01)
G05D 1/00 (2006.01)

(52) U.S. Cl.
CPC ......... *G05D 1/0212* (2013.01); *G05D 1/0088* (2013.01); *G05D 2201/0213* (2013.01)

(58) Field of Classification Search
CPC ............... G05D 1/0212; G05D 1/0088; G05D 2201/0213

(Continued)

(56) References Cited

U.S. PATENT DOCUMENTS 10,807,609 B2 * 10/2020 Goto ................... B60W 30/12
10,890,909 B2 * 1/2021 Flynn .................. B60W 40/09
(Continued)

FOREIGN PATENT DOCUMENTS

JP 2006-195641 A 7/2006
JP 2010-126130 A 6/2010
(Continued)

OTHER PUBLICATIONS

International Search Report of PCT/JP2017/001174 dated Apr. 18, 2017.

Primary Examiner — Yazan A Soofi
(74) Attorney, Agent, or Firm — Mattingly & Malur, PC

(57) ABSTRACT

The present invention provides a moving object controller and a moving object control method capable of selecting a movement plan based upon detection accuracy of external information. A moving object controller 100 includes a plan generation unit 110 that generates at least one movement plan based upon external information on an external world of a moving object 1 and internal information on an internal part of the moving object; an accuracy estimation unit 120 that estimates detection accuracy of the external information based upon the external information, the internal information, and predetermined past information, among the movement plans generated by the plan generation unit; and a plan selection unit 130 that selects a movement plan of an execution target from among the movement plans generated by the plan generation unit based upon the detection accuracy of the external information estimated by the accuracy estimation unit.

10 Claims, 15 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2016/0356623 | A1* | 12/2016 | Matsumoto | G08G 1/096811 |
| 2017/0227970 | A1* | 8/2017 | Taguchi | G01S 19/48 |
| 2018/0023966 | A1* | 1/2018 | Iwai | G08G 1/0145 |
| | | | | 701/423 |
| 2020/0184236 | A1* | 6/2020 | Aguiar | G06T 7/80 |
| 2020/0193368 | A1* | 6/2020 | Bhatia | B60R 25/10 |

FOREIGN PATENT DOCUMENTS

| | | |
|---|---|---|
| JP | 2012-221291 A | 11/2012 |
| WO | 2016/139748 A1 | 9/2016 |

* cited by examiner

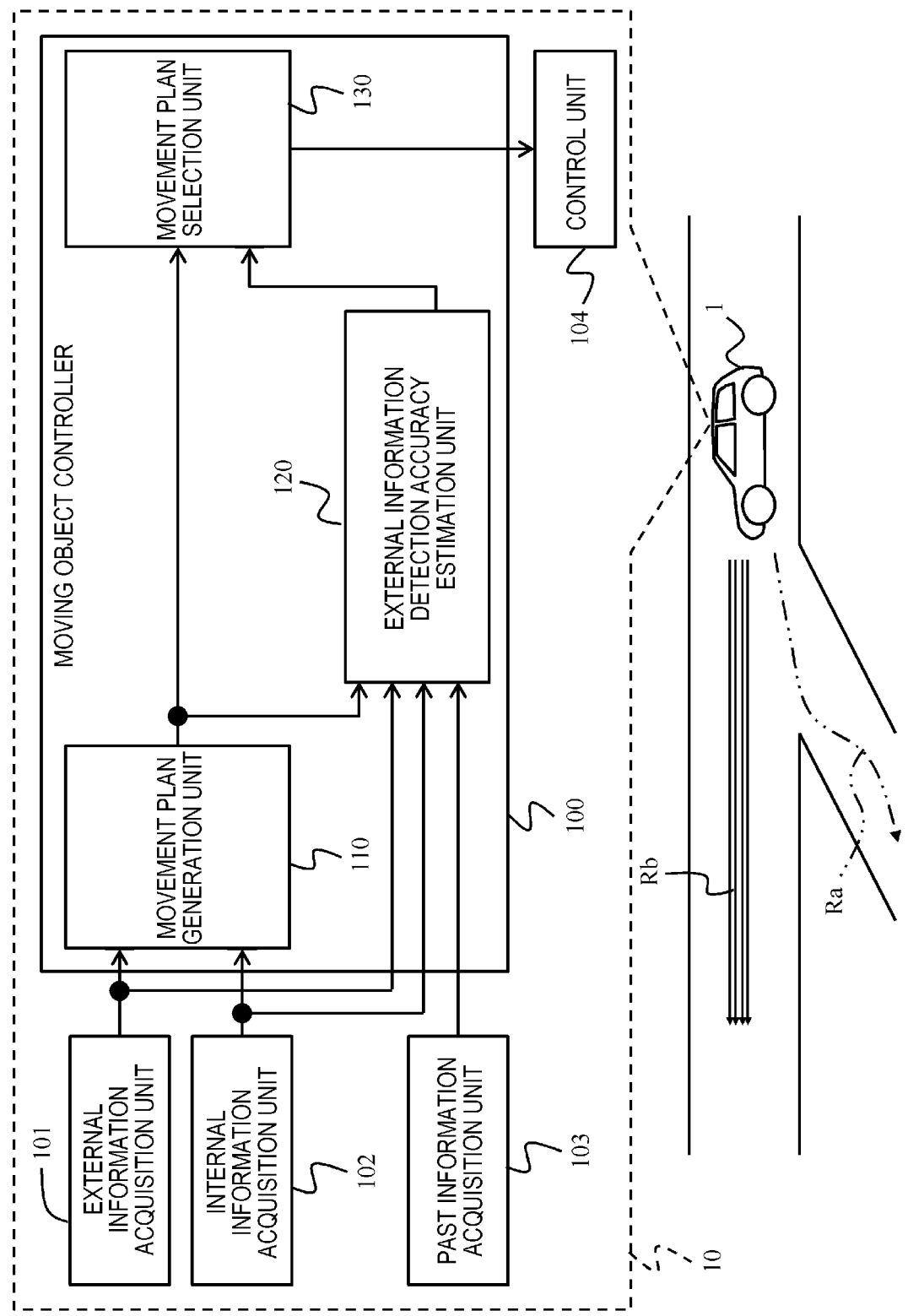

[FIG. 2]
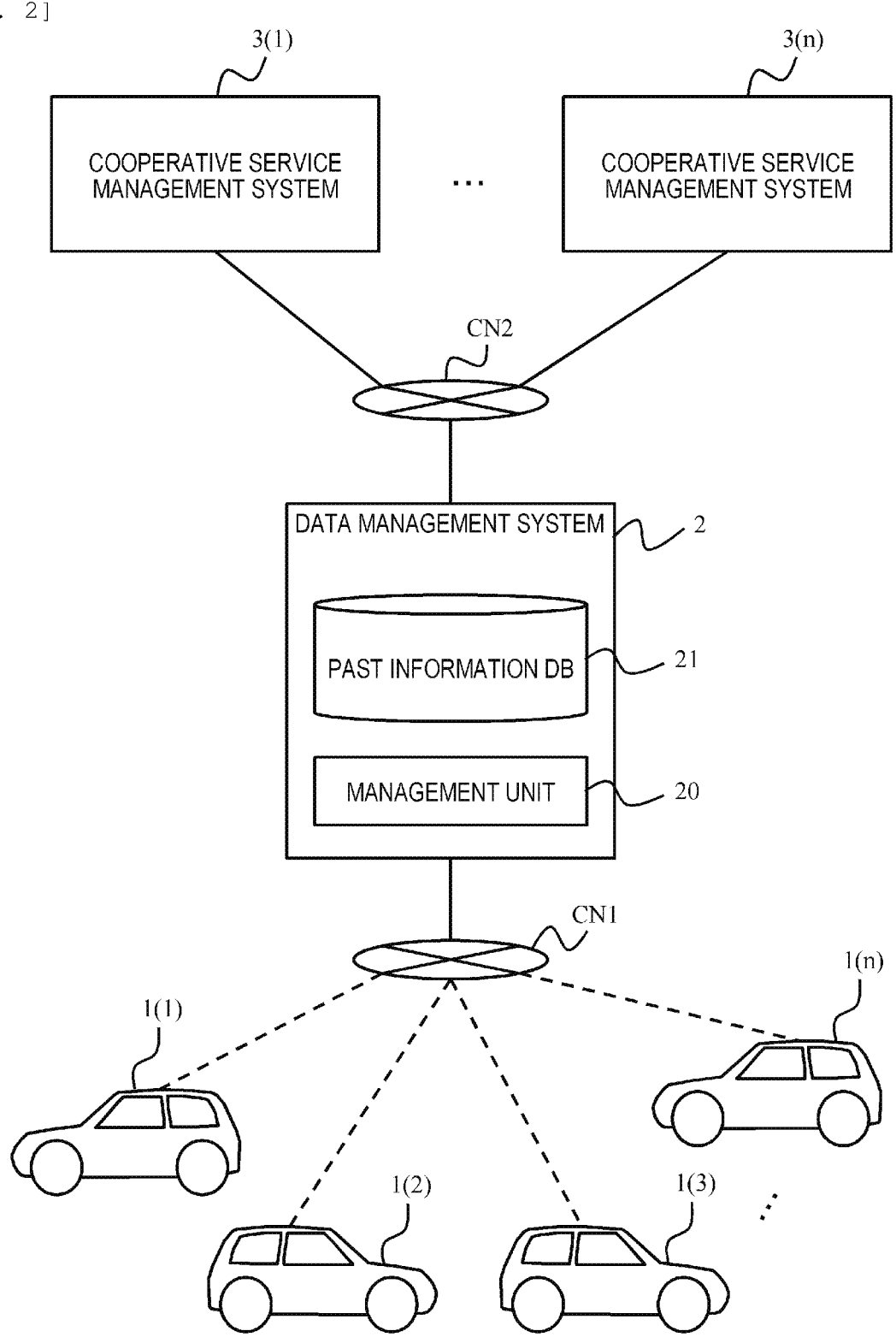

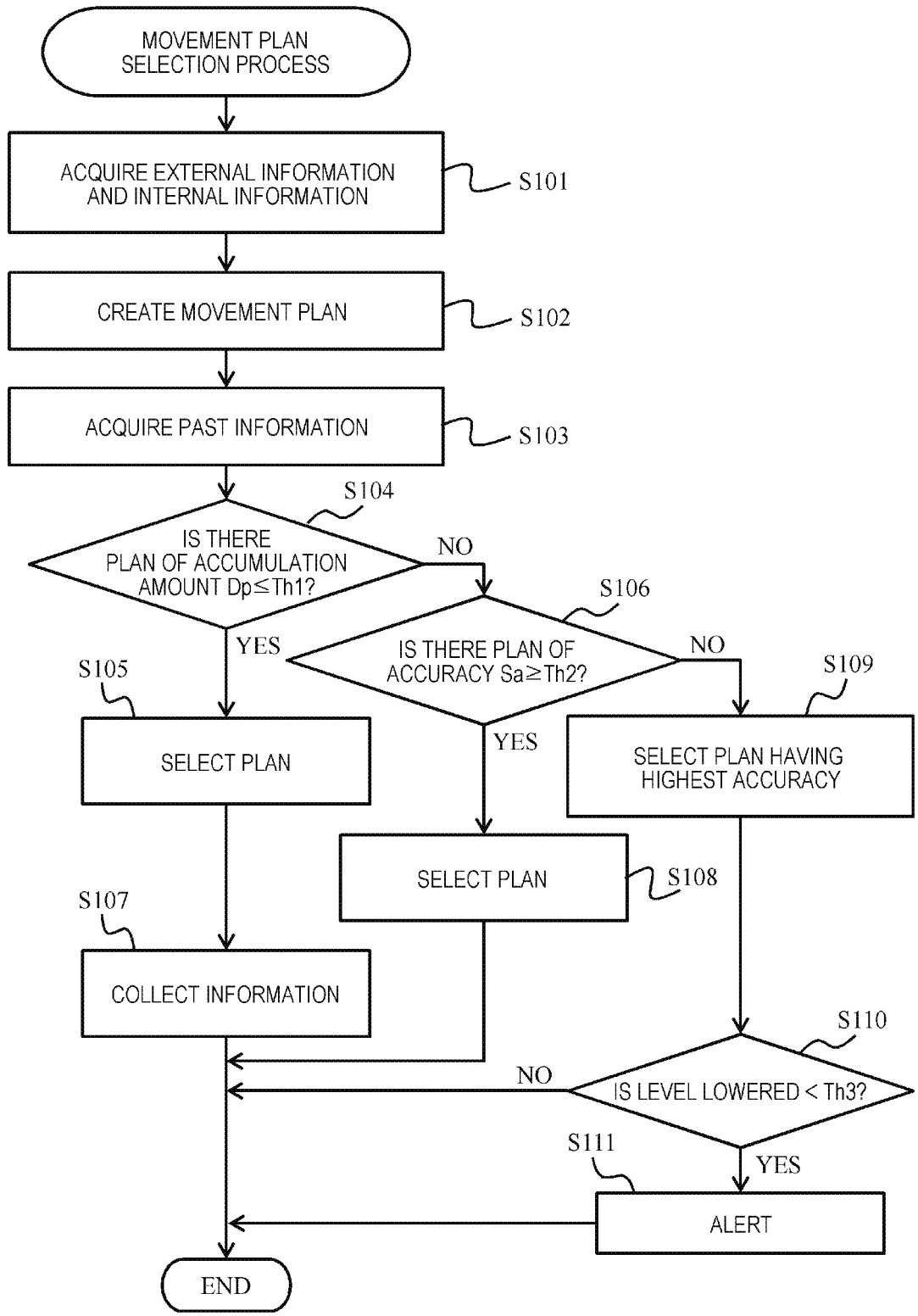
[FIG. 3]

| C101 | C102 | C103 | C104 | C105 | C106 | C107 |
|---|---|---|---|---|---|---|
| POSITION | MOVING DIRECTION | SEASON | ILLUMINANCE | TIME ZONE | WEATHER | NUMBER OF DATA |
| X1,Y1 | 168° | SUMMER | CLOUDINESS EQUIVALENT | SUNRISE | RAINY | 4 |
| | 12° | SUMMER | CLOUDINESS EQUIVALENT | SUNSET | CLOUDY | 5 |
| X1,Y1 | 164° | SUMMER | SUNLIGHT EQUIVALENT | DAYTIME | RAINY | 2 |
| | 16° | SUMMER | NIGHTTIME EQUIVALENT | NIGHTTIME | CLOUDY | 6 |
| ... | ... | ... | ... | ... | ... | ... |

| C108(1) | | C108(2) | | ... | C108(n) | |
|---|---|---|---|---|---|---|
| ACCURACY OF SENSOR 1 | | ACCURACY OF SENSOR 2 | | ... | ACCURACY OF SENSOR 3 | |
| STABILITY | DISPERSION | STABILITY | DISPERSION | ... | STABILITY | DISPERSION |
| ACCEPTABLE | SMALL | ACCEPTABLE | SMALL | ... | ACCEPTABLE | SMALL |
| GOOD | SMALL | GOOD | SMALL | ... | GOOD | SMALL |
| GOOD | LARGE | GOOD | LARGE | ... | GOOD | LARGE |
| GOOD | MEDIUM | GOOD | MEDIUM | ... | GOOD | MEDIUM |
| ... | ... | ... | ... | ... | ... | ... |

[FIG. 5]
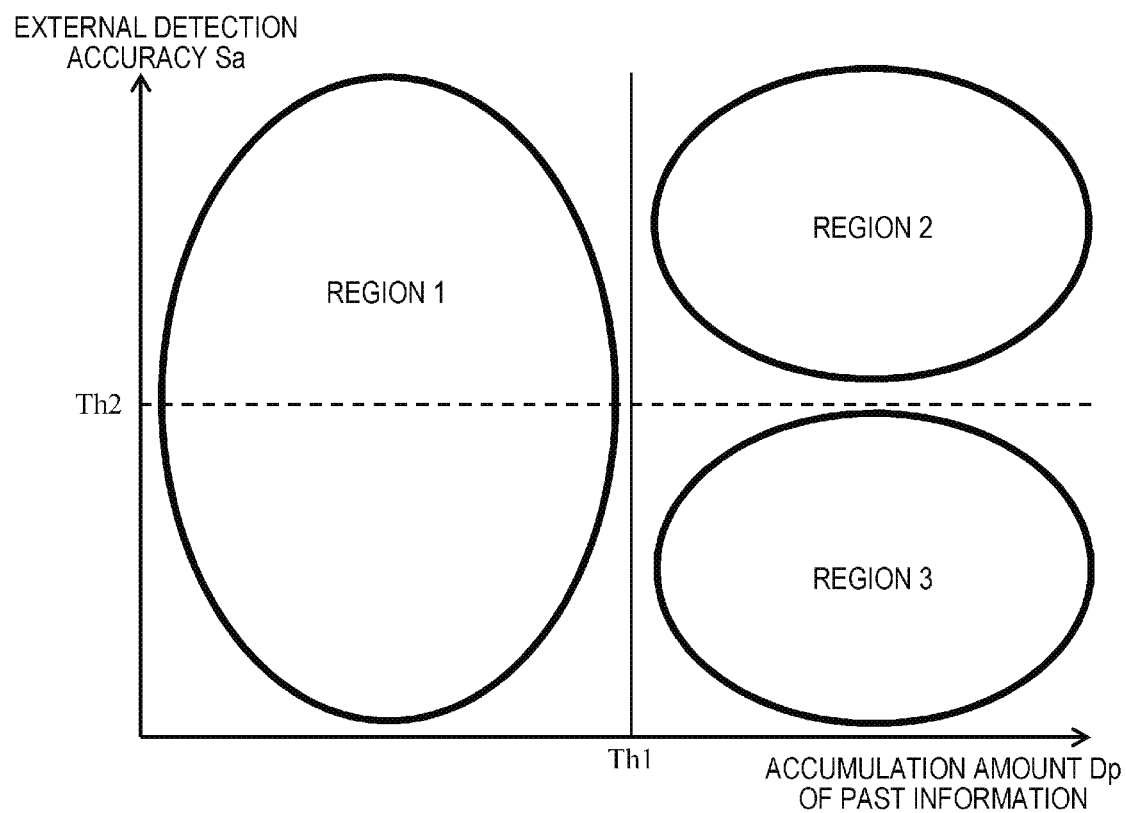

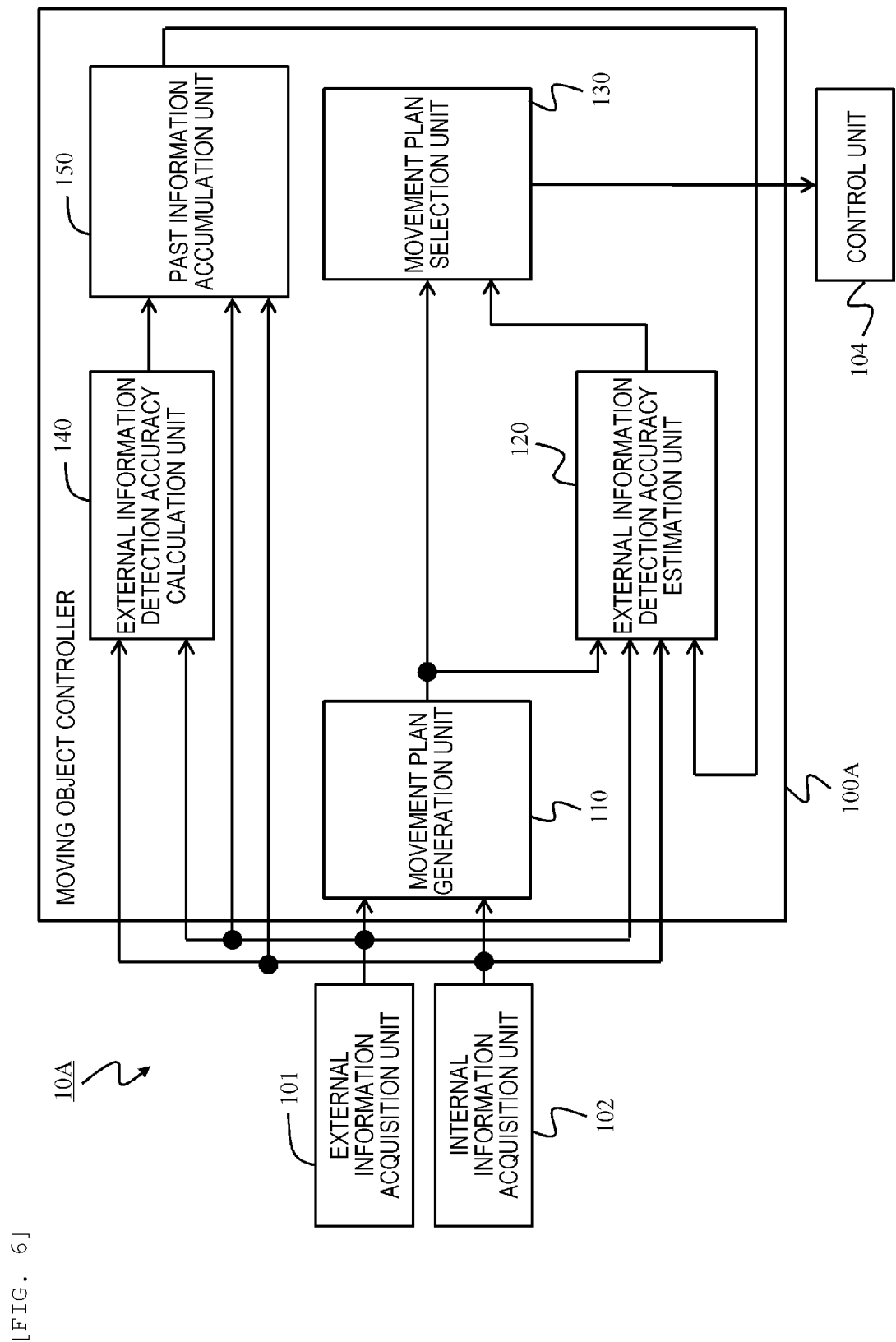
[FIG. 6]

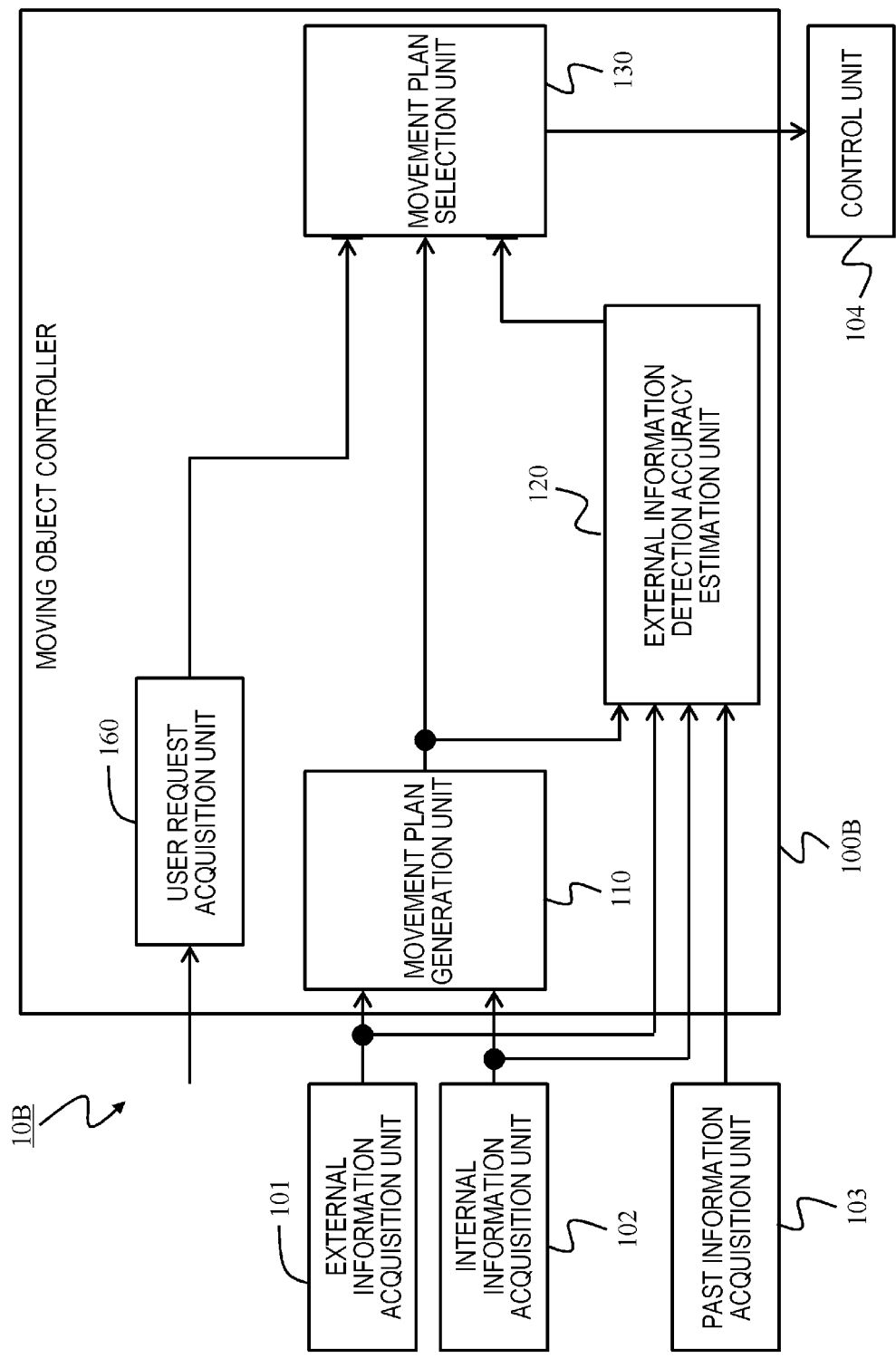
[FIG. 7]

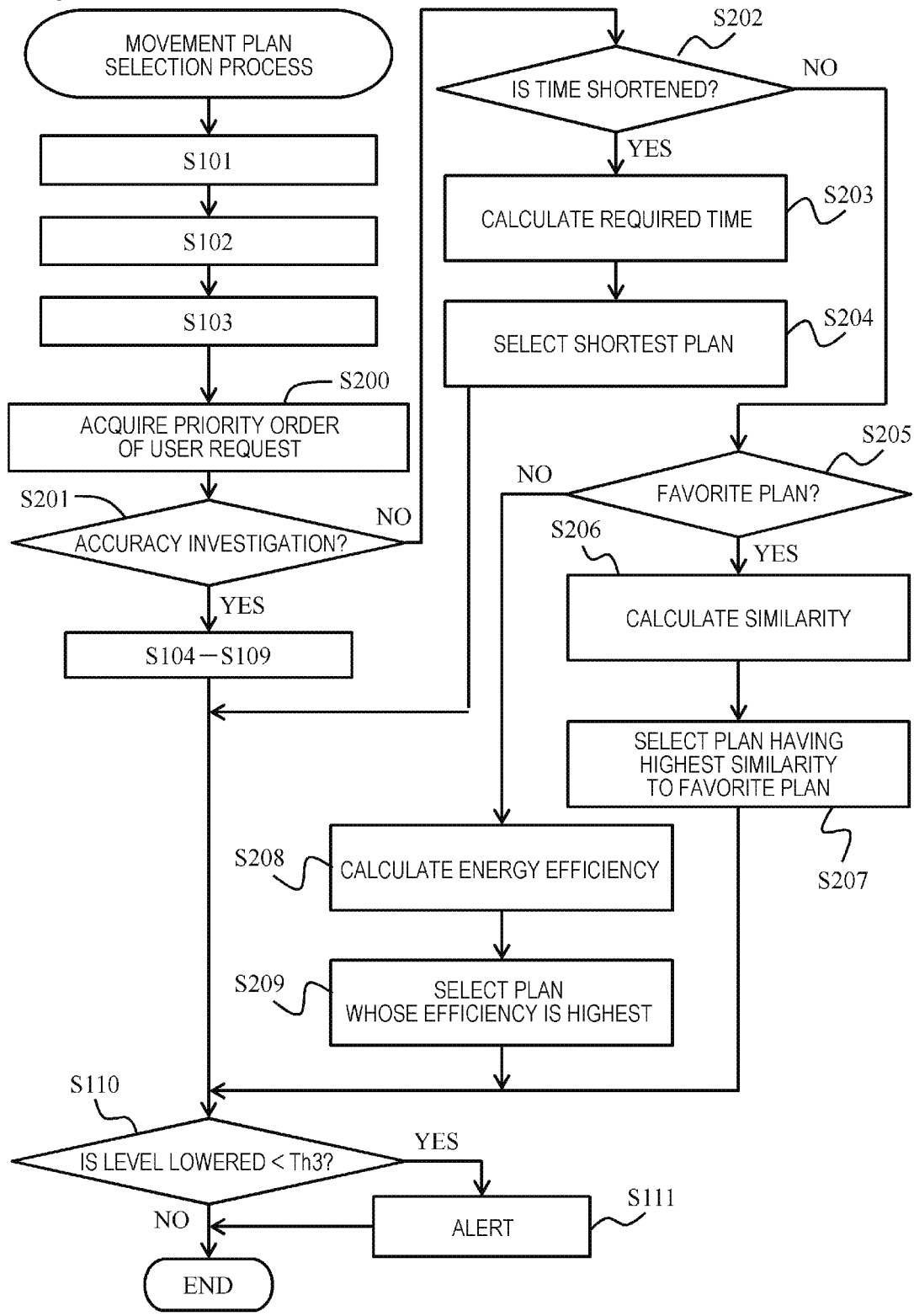
[FIG. 8]

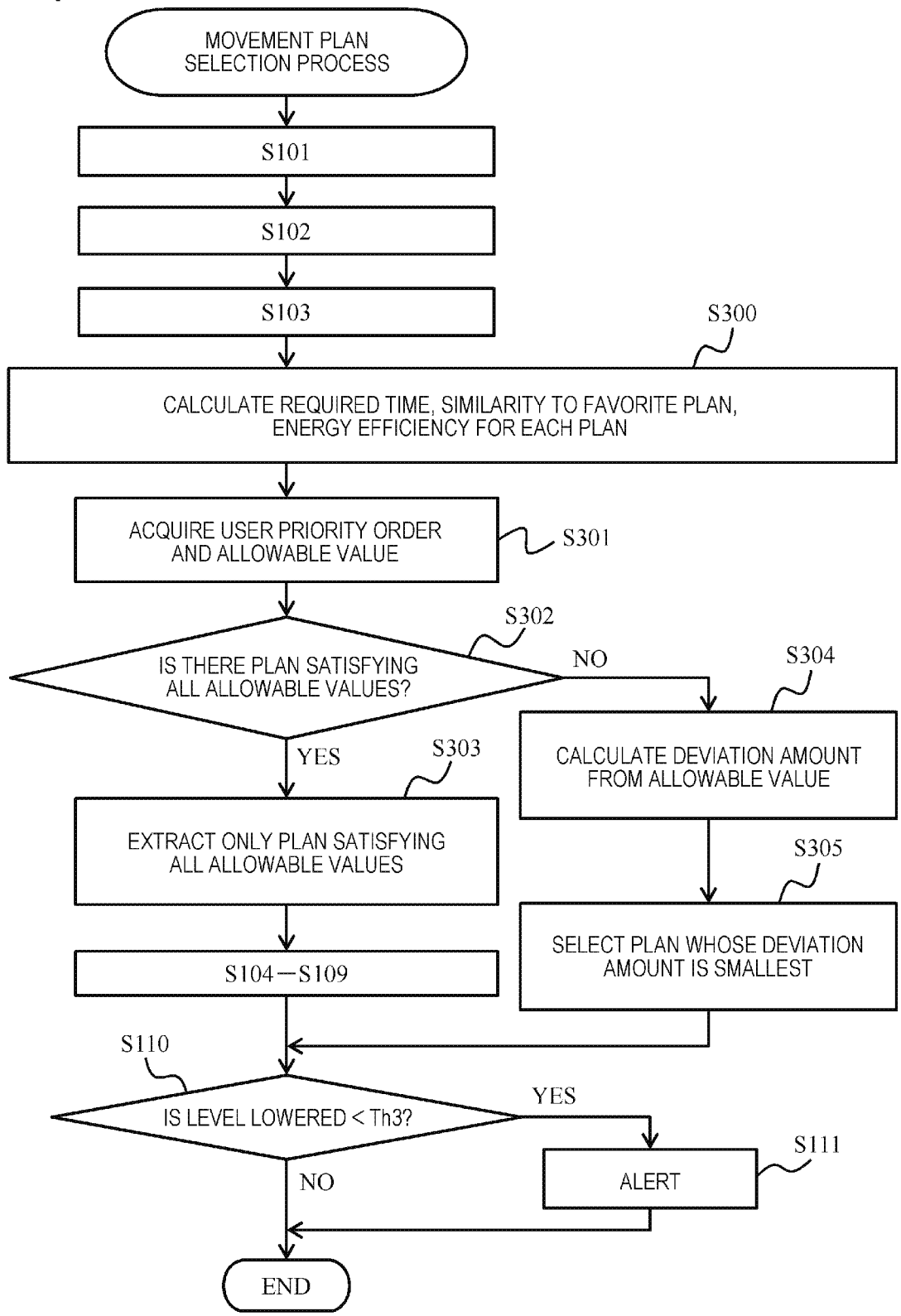
[FIG. 9]

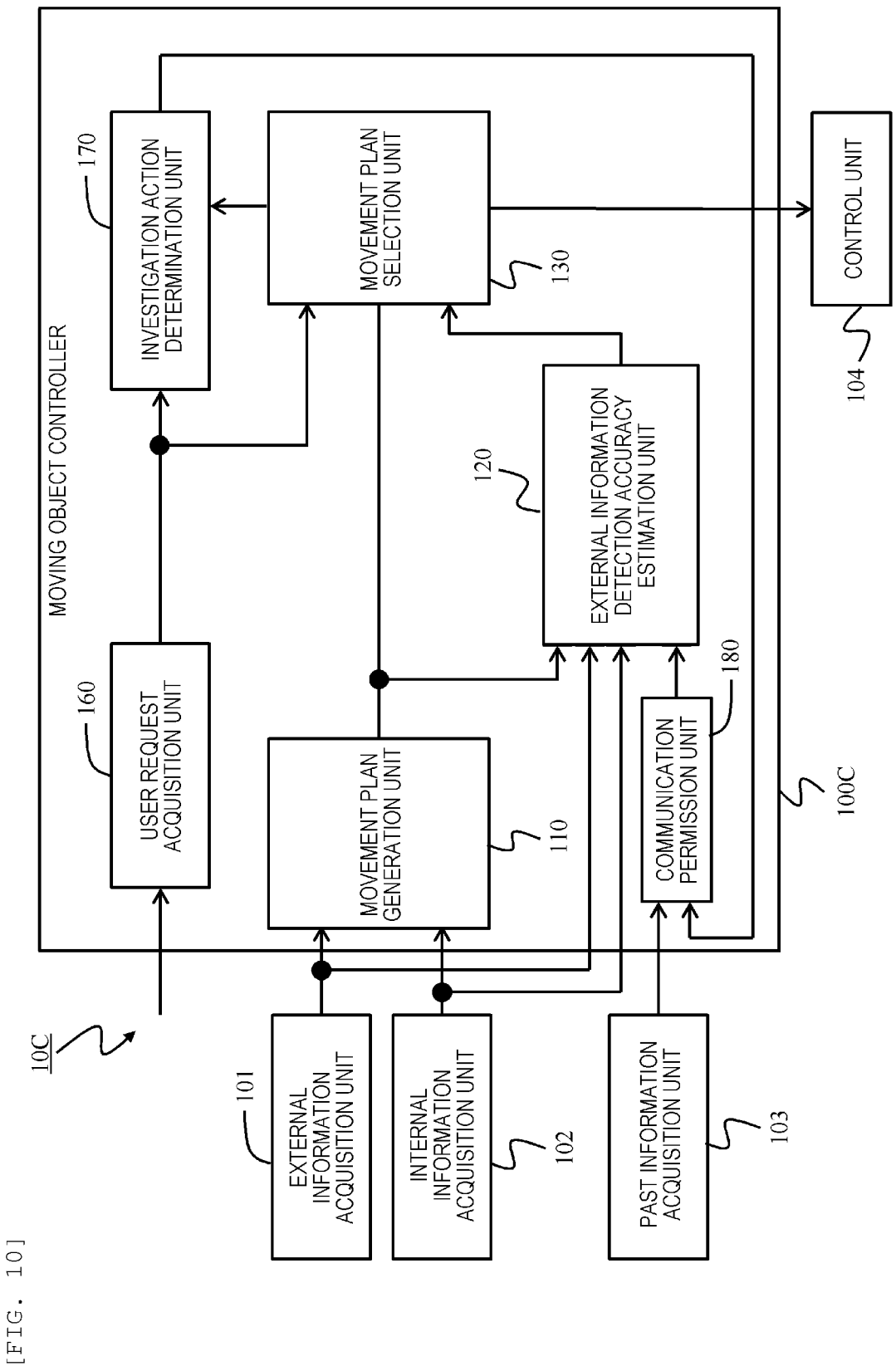
[FIG. 10]

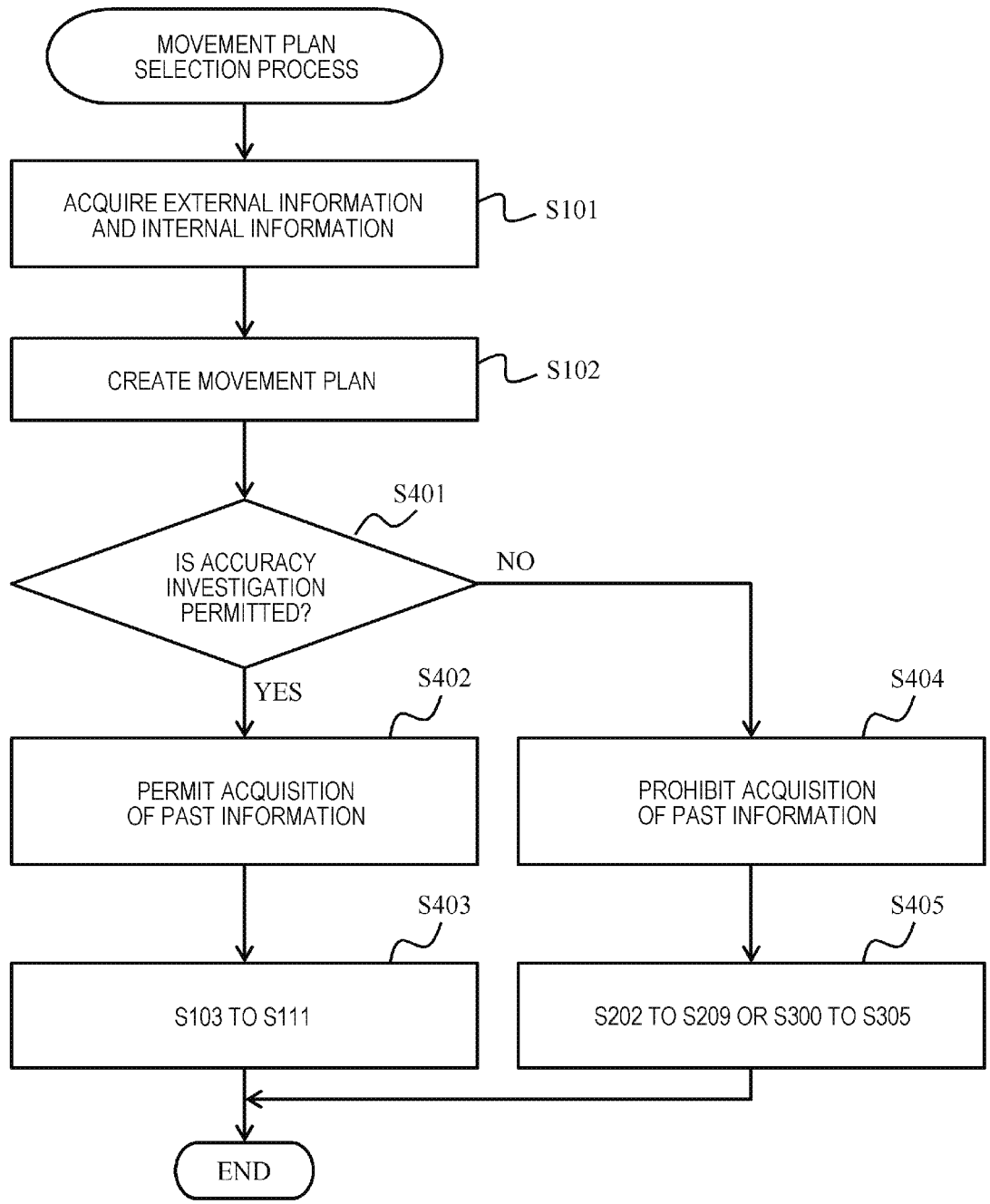
[FIG. 11]

[FIG. 12]
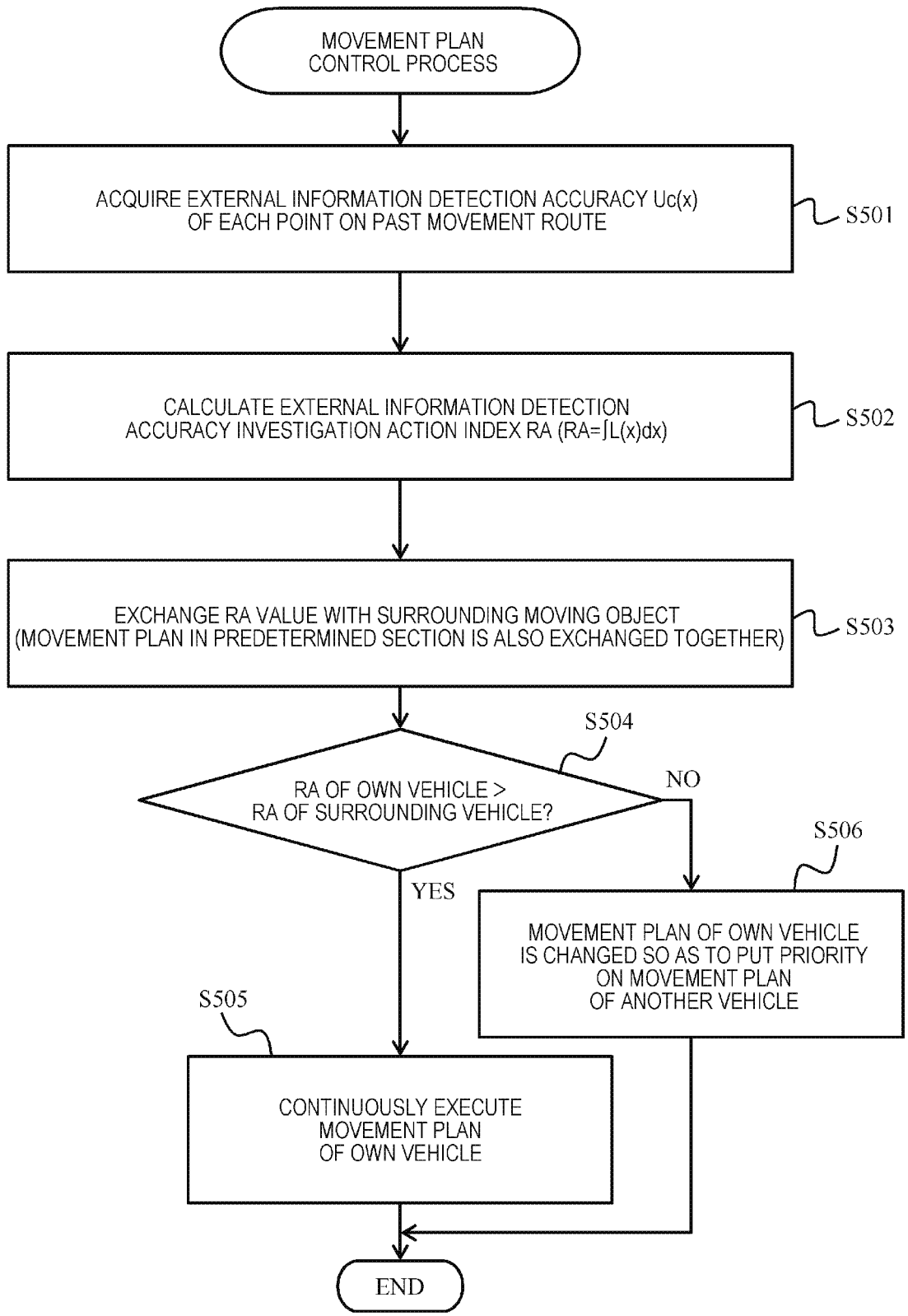

[FIG. 13]
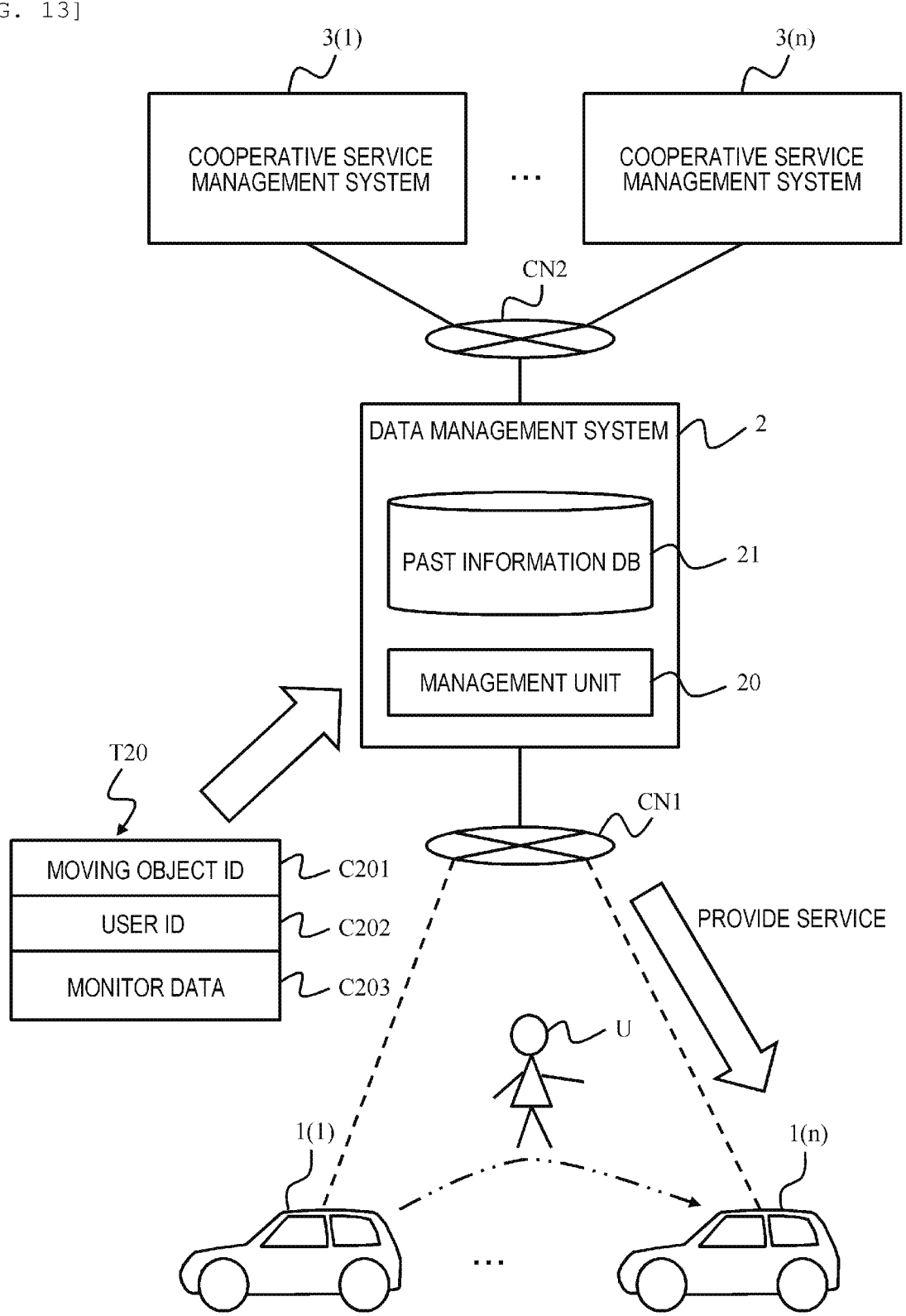

[FIG. 14]
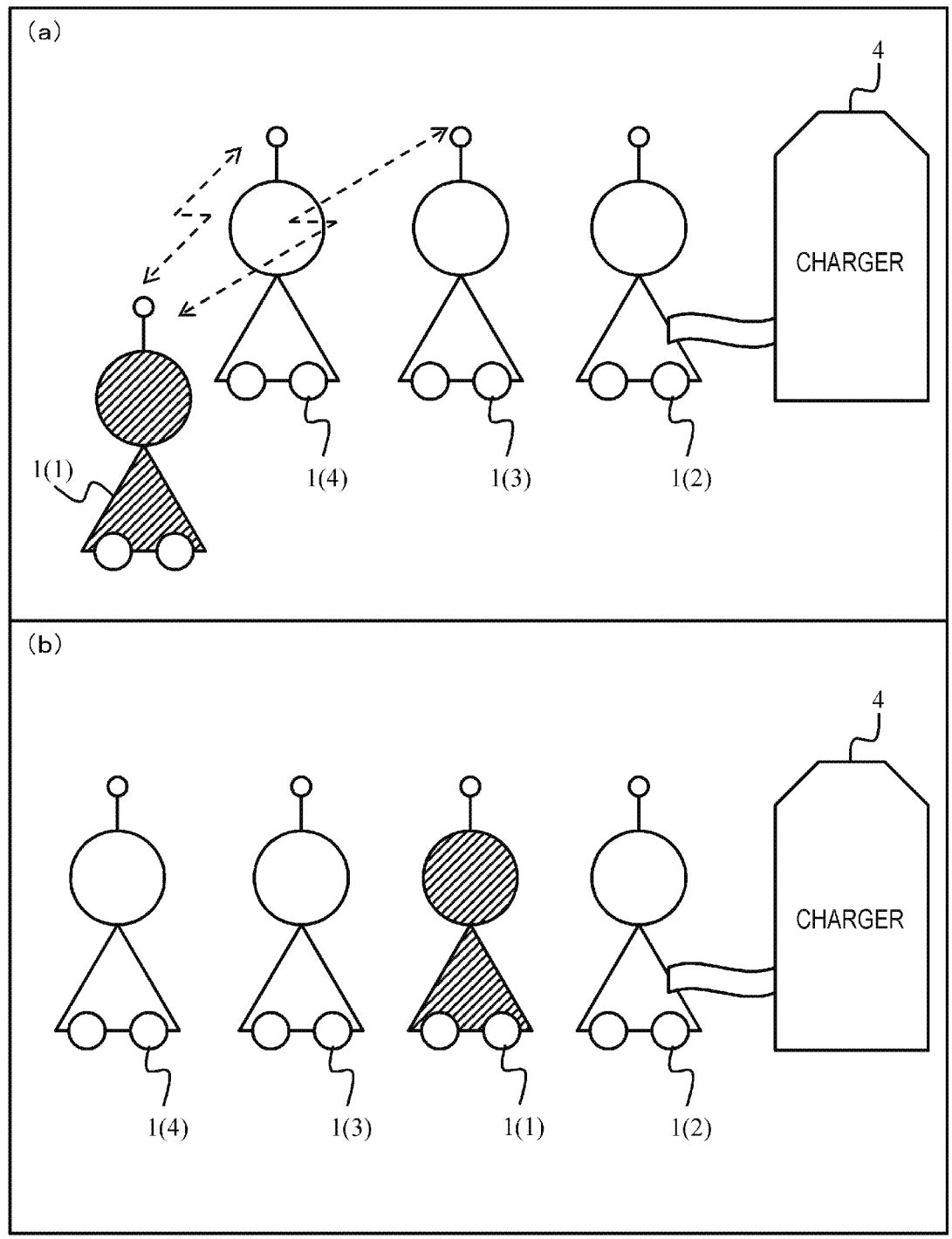

[FIG. 15]
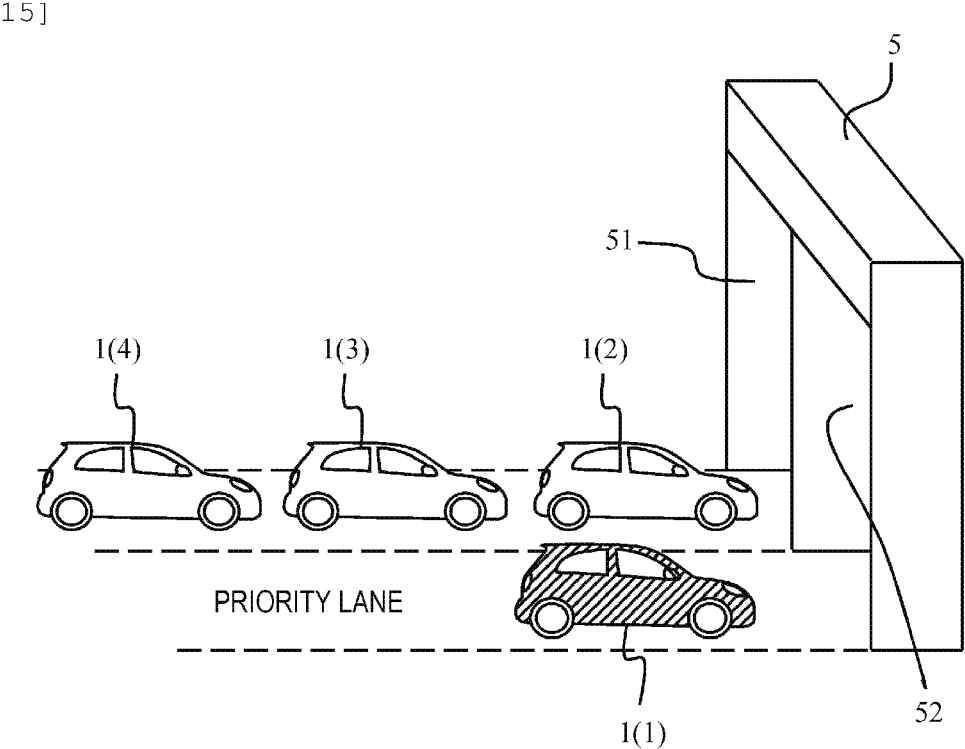

MOVING OBJECT CONTROLLER AND MOVING OBJECT CONTROL METHOD

TECHNICAL FIELD

The present invention relates to a moving object controller and a moving object control method.

BACKGROUND ART

In recent years, as known as an automatic driving vehicle, a moving object that autonomously generates a movement plan based upon external information such as image dada, and the like photographed by a camera when information on a destination is provided and that moves based upon the movement plan has been developed.

In the moving object described above, when detection accuracy of the external information is lowered or self-position estimation based upon the external information fails, there exists a possibility that reliability of an autonomous movement may deteriorate. In JP-A-2006-195641 (PTL 1), disclosed is a technology for changing a control level according to reliability of an external sensor. In JP-A-2012-221291 (PTL 2), disclosed is a technology for controlling the moving object so as to pass through a route on which feature information, and the like necessary for estimating its own position cannot be acquired, and for improving efficiency of collecting the feature information, and the like.

CITATION LIST

Patent Literature

PTL 1: JP-A-2006-195641
PTL 2: JP-A-2012-221291

SUMMARY OF INVENTION

Technical Problem

In the related art, when there exists a place where detection accuracy of an external sensor is low on a trajectory of a moving object, there is a problem in that a control level of an autonomous movement deteriorates in that place.

For example, in a method of PTL 1, information from an obstacle sensor mounted on an automobile, information from a sensor mounted on a road side, and a result of a positional relationship with another vehicle traveling in the vicinity, which is acquired by inter-vehicle communication, are compared with each other. Accordingly, in PTL 1, when existence of another vehicle is detected by a sensor having high reliability or detected by a plurality of sensors, it is determined that existence reliability of another vehicle is high. In PTL 1, when it is determined that the reliability is high, an automatic brake is executed; when it is determined that the reliability is moderate, an alarm buzzer is only sounded; and when it is determined that the reliability is low, information such as a position, a traveling direction, and the like of a surrounding vehicle is only presented to a driver.

In a method of PTL 2, when feature information can be acquired even at least once, it is determined that information necessary for the autonomous movement is collected, and the route is not selected any more. In PTL 2, as information acquired from a vehicle passing through the aforementioned route thereafter is the same as previously acquired information, reliability of the information is increased, and as the reliability thereof is higher, for example, a control level such as increasing a speed limit of automatic driving, and the like is improved. However, since acquisition accuracy of external information varies depending on, for example, weather and brightness of an environment, and the like, it is not possible to perform the automatic driving in the same manner even thereafter only with the external information even though the external information can be acquired once in the past.

The present invention has been made in consideration of the above-described problems and an object thereof is to provide a moving object controller and a moving object control method capable of selecting a movement plan based upon detection accuracy of external information. Another object of the present invention is to provide a moving object controller and a moving object control method capable of selecting a movement plan when there exists the movement plan whose detection accuracy of the external information is high, and capable of collecting information necessary for improving the detection accuracy of the external information when a movement plan whose detection accuracy of the external information is low.

Solution to Problem

In order to solve the above-described problems, a moving object controller according to the present invention includes: a plan generation unit that generates at least one movement plan based upon external information on an external world of a moving object and internal information on an internal part of the moving object; an accuracy estimation unit that estimates detection accuracy of the external information based upon the external information, the internal information, and predetermined past information, among the movement plans generated by the plan generation unit; and a plan selection unit that selects a movement plan of an execution target from among the movement plans generated by the plan generation unit based upon the detection accuracy of the external information estimated by the accuracy estimation unit.

Advantageous Effects of Invention

According to the present invention, a movement plan of an execution target can be selected from among generated movement plans based upon estimated detection accuracy of external information.

BRIEF DESCRIPTION OF DRAWINGS

FIG. 1 is a functional block diagram of a moving object control system including a moving object controller.

FIG. 2 is an overall system diagram illustrating a relationship between a plurality of moving object control systems and a data management system.

FIG. 3 is a flowchart illustrating a process of selecting a movement plan.

FIG. 4 is a configuration example of past information.

FIG. 5 is an explanatory diagram illustrating a state of selecting the movement plan based upon detection accuracy of external information and an accumulation amount of the past information.

FIG. 6 is a functional block diagram according to a modified example of the moving object control system.

FIG. 7 is a functional block diagram of a moving object control system according to a second embodiment.

FIG. 8 is a flowchart illustrating a process of selecting a movement plan.

FIG. 9 is a flowchart illustrating a process of selecting a movement plan according to a third embodiment.

FIG. 10 is a functional block diagram of a moving object control system according to a fourth embodiment.

FIG. 11 is a flowchart illustrating a process of selecting a movement plan.

FIG. 12 is a flowchart illustrating a process of controlling a movement plan according to an actual result related to an investigation action of external information.

FIG. 13 is an explanatory diagram illustrating an overall system according to a fifth embodiment.

FIG. 14 is an explanatory diagram illustrating an example of a predetermined service which is cooperative with a moving object control system according to a sixth embodiment.

FIG. 15 is an explanatory diagram illustrating another example of a predetermined service.

DESCRIPTION OF EMBODIMENTS

Hereinafter, an embodiment of the present invention will be described with reference to the drawings. In the embodiment, as described later, a moving object can be used as a device for collecting information useful for generating a movement plan having high reliability. In the embodiment, it is possible to control a case in which the moving object is used as an information collecting device and to control reliability improvement of a movement of the moving object, depending on a situation. In the embodiment, when the moving object is not used as the information collecting device, the moving object can be moved by selecting a route having high reliability as much as possible. Further, in the embodiment, an incentive can be provided with respect to contribution of the moving object as the information collecting device.

Here, for example, a moving object controller 100 according to the embodiment is provided with a movement plan generation unit 110 that generates a movement plan based upon external information and internal information; an external information detection accuracy estimation unit 120 that estimates detection accuracy information on the detection accuracy of the external information; and a movement plan selection unit 130 that selects a movement plan of an execution target from among the generated movement plans based upon the estimated detection accuracy of the external information.

According to the embodiment, information useful for generating a movement plan having high reliability can be collected, and as a result, an opportunity of selecting the movement plan having the high reliability can be increased, thereby improving the reliability of an autonomous movement of the moving object.

First Embodiment

A first embodiment will be described with reference to FIGS. 1 to 6. In the embodiment, an automobile will be described as an example of the "moving object". The present invention can be applied not only to the automobile, but also to, for example, a robot capable of moving on the ground, on the water, in the water, and in the atmosphere, and a so-called drone.

FIG. 1 is a functional block diagram of a moving object control system 10 provided in a moving object 1. The moving object 1 such as a passenger car, a truck, and the like mounts the moving object control system 10. The moving object control system 10 includes, for example, the moving object controller 100, an external information acquisition unit 101, an internal information acquisition unit 102, a past information acquisition unit 103, and a control unit 104.

The external information acquisition unit 101 has a function of acquiring information on an external world of the moving object 1. The external information includes information on a traffic environment of the moving object 1. The external information includes, for example, an image of the periphery of the moving object 1, a distance to another preceding moving object (a preceding vehicle), a speed of the preceding vehicle, and the like. The external information acquisition unit 101 acquires obstacle information such as the existence of an obstacle in the vicinity and a distance to the obstacle, a moving direction of the obstacle and a speed thereof, and information on other traffic environments. The obstacle information can be detected by, for example, a sensor (an external sensor) such as a camera, a radar, a sonar, and the like provided in the moving object 1. Other traffic environments can be detected by a sensor such as an illuminance sensor, a temperature sensor, a humidity sensor, and the like, and can also use date information and weather information provided by an external institution. The external information acquisition unit 101 inputs the acquired external information to the moving object controller 100.

The internal information acquisition unit 102 has a function of acquiring information on an internal part of the moving object 1. The internal information includes, for example, a speed, a moving direction, self-position information by a GPS (Global Positioning System), altitude information, a rotation speed, a rotation angle, a generated torque, and the like of the moving object 1.

The past information acquisition unit 103 has a function of acquiring predetermined past information. The predetermined past information includes, for example, past external information, past internal information, and detection accuracy of the past external information. As described later in FIG. 6, a function 150 that accumulates the past information may be configured to be provided at the inside of the moving object controller 100, and a part or all of the past information accumulated in the past information accumulation unit 150 may be configured to be inputted to the external information detection accuracy estimation unit 120. Alternatively, a data management system 2 which will be described later in FIG. 2 may be configured to unitarily manage the past information on the plurality of moving objects 1 and may be configured to provide the past information being accumulated and managed in response to a request from each moving object controller 100.

The control unit 104 has a function of moving the moving object 1 by controlling a power train of the moving object 1 and a steering mechanism thereof. The control unit 104 can also autonomously move the moving object 1 according to a movement plan inputted from the moving object controller 100, and can also move the moving object 1 according to a manual operation by a user.

A configuration of the moving object controller 100 will be described. The moving object controller 100 is a device that generates a movement plan and collects information to be used for generating the movement plan. The moving object controller 100 has functions such as, for example, the movement plan generation unit 110, the external information detection accuracy estimation unit 120, and the movement plan selection unit 130. A microprocessor (not illustrated) provided in the moving object controller 100 executes a predetermined computer program read out from a memory or a storage device (both are not illustrated), thereby realizing the above-described respective functions 110 to 130.

The movement plan generation unit 110 as a "plan generation unit" generates at least one (usually a plurality of) movement plan defining a movement route, and the like of the moving object 1 from the external information acquired by the external information acquisition unit 101 and the internal information acquired by the internal information acquisition unit 102. The movement plan generated by the movement plan generation unit 110 is a candidate of the movement plan to be selected as an execution target. Therefore, the movement plan generated by the movement plan generation unit 110 can be referred to as a movement plan candidate.

The external information detection accuracy estimation unit 120 collates current external information and current internal information with past external information and past internal information, calls a movement plan in a similar situation in the past and external information detection accuracy at that time, and sends the movement plan and the external information detection accuracy to the movement plan selection unit 130. The past external information and the past internal information may be managed by the data management system 2 existing outside the moving object 1, or may be managed by an internal memory of the moving object 1.

The movement plan selection unit 130 as a "plan selection unit" selects one movement plan from among the plurality of movement plan candidates created by the movement plan generation unit 110 based upon the external information detection accuracy of each movement plan candidate inputted from the external information detection accuracy estimation unit 120. The selected movement plan corresponds to the "movement plan of the execution target". The movement plan selection unit 130 outputs the movement plan of the execution target to the control unit 104.

The moving object controller 100 can estimate (predict) the external information detection accuracy and extract a movement plan in which information having a degree of estimating the external information detection accuracy is not collected yet by being provided with the above-described configuration.

When finding a movement plan candidate Ra including a route on which the information for estimating the external information detection accuracy is not sufficiently collected, the moving object controller 100 can select the movement plan candidate Ra whose information amount is not sufficient enough as the movement plan of the execution target. Accordingly, the moving object controller 100 can collect information on the movement plan Ra whose information amount is not sufficient enough, and can contribute to the generation of the movement plan having high reliability.

On the other hand, the moving object controller 100 can realize autonomous movement at a high control level by selecting a movement plan candidate Rb in which information only for estimating the external information detection accuracy is accumulated. Accordingly, the moving object controller 100 can use the external information detection accuracy as a determination criterion in a case of selecting the movement plan of the execution target from the movement plan candidates Ra and Rb.

FIG. 2 is an explanatory diagram illustrating a relationship between the plurality of moving objects 1, the data management system 2 that manages the information collected by each moving object 1, and a cooperative service management system 3. The data management system 2 is connected to the moving object controllers 100 of each of the moving objects 1(1) to 1(n) via a communication network CN1, and is connected to each of the cooperative service management systems 3(1) to 3(n) via a communication network CN2. Hereinafter, when not particularly distinguished, the moving objects 1(1) to 1(n) may be referred to as the moving object 1 and the cooperative service management systems 3(1) to 3(n) may be referred to as the cooperative service management system 3.

The communication network CN1 and the communication network CN2 are provided as, for example, a public line or a dedicated circuit. The communication network CN1 and the communication network CN2 may use the same communication protocol or may use respectively different communication protocols.

The data management system 2 is a computer system that collects and manages the information from the moving object controller 100 of each moving object 1, and includes, for example, a management unit 20 and a past information database 21. The management unit 20 acquires the external information, the internal information, and the estimated external information detection accuracy from the moving object controller 100 of each moving object 1, and stores the external information, the internal information, and the estimated external information detection accuracy in the past information database 21. The management unit 20 provides a part of the past information stored in the past information database 21 according to a request from the moving object controller 100 of each moving object 1.

The moving object controller 100 of each moving object 1 estimates the external information detection accuracy of each movement plan candidate by using the past information acquired from the data management system 2, and then selects the movement plan of the execution target based upon the detection accuracy.

The cooperative service management system 3 corresponds to a "predetermined service management system". The cooperative service is a service that is provided in cooperation with an information collection activity to be executed when the moving object controller 100 selects the movement plan. The cooperative service includes, for example, an energy supply service to the moving object 1, a priority use service of a route on which the moving object 1 is scheduled to move, a charge payment service related to the use of the moving object 1, and the like.

FIG. 3 is a flowchart of a movement plan selection process. The moving object controller 100 acquires the external information from the external information acquisition unit 101 and the internal information from the internal information acquisition unit 102, respectively (S101).

The movement plan generation unit 110 of the moving object controller 100 creates at least one movement plan (the movement plan candidate) for achieving a predetermined action goal based upon the external information and the internal information acquired in step S101 (S102).

The action goal means a goal for the movement of the moving object 1, and, for example, is a destination. The action goal is not limited to a final destination, but may also include a via-point. The plurality of action goals may also be set. Further, a label is respectively provided to an action goal to be absolutely achieved and an action goal which is desired to be achieved, and the order of priority is further provided to the action goal which is desired to be achieved.

For example, the destination corresponds to the action goal to be absolutely achieved. For example, required time, cost, and the like correspond to the action goal which is desired to be achieved. Alternatively, scenery and atmosphere designated by a user may be set as the action goal which is desired to be achieved.

When setting the priority on the action goal, the user may manually set the priority or may automatically set the priority based upon the past action history of the user.

When creating the movement plan, the movement plan generation unit 110 creates not only a movement plan candidate whose distance and arrival time are the shortest but also a movement plan candidate which particularly makes a detour. Desirably, the movement plan generation unit 110 generates a plurality of movement plan candidates (for example, about five movement plan candidates) in the order of a route having low complexity (a route having a small curve and corner, a route having a wide route width) or in the order in which the action goal having high priority is satisfied.

The moving object controller 100 acquires the past information which has high similarity between the current external information and internal information and corresponds to the movement plan candidate created in step S102 from the past information acquisition unit 103 (S103).

Here, past information generated by its own moving object 1 (moving object 1 itself) may be used, or past information generated by anther moving object 1 may be used. When the data management system 2 manages the information of each moving object 1, the past information generated by another moving object 1 can be acquired via the data management system 2. Alternatively, when the moving objects 1 can communicate with each other, the past information generated by another moving object 1 can be acquired by so-called inter-vehicle communication. The moving object 1 can acquire the past information generated by another moving object 1 even by connecting a storage medium storing the past information generated by another moving object 1 to the moving object controller 100.

A configuration of past information T10 will be described with reference to FIG. 4. The external information and the internal information that the moving object experienced in the past and the external information detection accuracy at that time are included in the past information T10, and are stored in such a manner that the accuracy of each sensor can be referred to for the external information and the internal information.

The past information T10 includes, for example, a position C101, a moving direction C102, a season C103, illuminance C104, a time zone C105, a weather C106, the number of data C107, and detection accuracy C108(1) to C108 (n) of each sensor.

The past information T10 respectively stores data with respect to an external sensor group and data with respect to an internal sensor group. Sensors that indicate the sensor detection accuracy C108(1) to C108(n) are determined according to a sensor arrangement of the moving object 1. For example, in the case of a certain moving object 1, the sensor detection accuracy C108(1) is a front camera, and the sensor detection accuracy C108(2) is a rear camera. In the case of another moving object 1, the sensor detection accuracy C108(1) is a forward radar, and the sensor detection accuracy C108(2) is a backward radar. Hereinafter, unless otherwise distinguished, it is referred to as the sensor detection accuracy C108. In the diagram, the sensor detection accuracy is abbreviated as "accuracy".

The position C101 indicates a position of the moving object 1 at the time of generating the past information, and is specified, for example, by latitude and longitude. The moving direction C102 indicates a moving direction of the moving object 1 at the time of generating the past information.

The season C103 indicates a season at the time of generating the past information, and can be distinguished by four seasons, for example, "spring, summer, autumn, and winter". Alternatively, the season C103 may be distinguished more in detail by 24 seasonal divisions, or may be roughly distinguished by "rainy season" or "dry season". The season is used to grasp a degree of temperature and humidity, a moving direction of the moving object in the sunrise time zone and the sunset time zone, and a positional relationship of the sun.

The illuminance C104 indicates illuminance at the time of generating the past information, and is distinguished and recorded as, for example, "cloudiness equivalent", "sunlight equivalent", and "nighttime equivalent". The illuminance may be represented as a numerical value. The time zone C105 indicates a time zone at the time of generating the past information, and is distinguished and recorded as, for example, "before and after sunrise", "before and after sunset", "daytime", and "nighttime". The time zone may be set by time. The weather C106 indicates weather at the time of generating the past information.

The accuracy and the like of obstacle detection by image analysis of a camera can be determined by referring to the information on the illuminance and the weather. For example, when the moving object 1 moves toward the morning sun, it is difficult to visually recognize an obstacle in front. Further, it is also difficult to detect an obstacle existing in a region where a light does not reach at night by a camera. Accordingly, the accuracy of the camera as an external sensor can be estimated by considering an ambient environment which may affect detection principles of the sensors of the illuminance, the weather, and the like.

When there is a margin in a data storage amount of the memory or storage for storing the past information T10, the temperature, the humidity, and the like may be stored as a specific numerical value. However, when the past information is stored with the specific numerical value, similarity determination between the current situation and the past situation becomes complicated. Thus, data granularity of the past information is designed in accordance with control performance, and the like required by control purpose of the moving object.

The number of data C107 indicates the number of similar past information. Ina flowchart which will be described later, a reference sign Dp is used to represent a numerical value stored in the number of data C107. The sensor detection accuracy C108 is detection accuracy of each sensor provided in the moving object 1. The sensor includes the external sensor and the internal sensor. The external sensor includes the camera, the radar, the sonar, and the like. The internal sensor includes the GPS, the speed sensor, and the like.

In FIG. 4, a stability rate of the detection of each sensor is respectively described as "impossible, acceptable, good" and dispersion is respectively described as "large, medium, and small". The stability rate and a dispersion value may be stored as a numerical value.

Referring back to FIG. 3, the movement plan selection unit 130 of the moving object controller 100 refers to the number of data C107 of the similar past information and the dispersion of the sensor detection accuracy C108 among the past information T10 acquired in step S103 (S104).

Then, the movement plan selection unit 130 determines whether or not there exists a movement plan candidate whose number of data C107 detected in the past is equal to or smaller than a predetermined threshold value Th1 among the movement plan candidates generated in step S102 (S104). In FIG. 3, the value stored in the number of data C107 is represented as an accumulation amount Dp. The threshold value Th1 corresponds to a "threshold value for a statistical value". The number of data C107(Dp) corresponds to the "statistical value".

When detecting a movement plan candidate whose number of data C107(Dp) is equal to or smaller than the threshold value Th1 (S104: YES), the movement plan selection unit 130 selects the movement plan candidate as the movement plan of the execution target, and then outputs the selected movement plan to the control unit 104 (S105).

When there exist a plurality of movement plan candidates whose number of data C107(Dp) is equal to or smaller than the threshold value Th1, for example, a movement plan candidate capable of satisfying the action goal having high priority is selected as the movement plan of the execution target. When the priority of the action goal is not set, a movement plan candidate having the smaller number of data C107(Dp) may be selected.

While the moving object 1 is moving based upon the movement plan selected in step S105, data detected in the external sensor group are collected by the external information acquisition unit 101, and data detected by the internal sensor group are collected by the internal information acquisition unit 102 (S107). The data collected from each sensor group are added to the past information T10.

The number of data and the dispersion are set as the "statistical value", and when either the movement plan candidate whose number of data C107(Dp) is equal to or smaller than the threshold value Th1 or a movement plan candidate whose dispersion is equal to or greater than a threshold value Thd (not illustrated) is found, "YES" may be determined in step S104.

When the movement plan candidate whose number of data C107(Dp) is equal to or smaller than the threshold value Th1 is not found (S104: NO), the movement plan selection unit 130 determines whether or not a movement plan candidate whose detection accuracy Sa of the external sensor is equal to or greater than a predetermined threshold value Th2 is included in the movement plan candidates generated in step S102 (S106). Here, the predetermined threshold value Th2 corresponds to a predetermined threshold value for accuracy.

Specifically, the movement plan selection unit 130 determines whether or not there exists a movement plan whose external information detection accuracy estimated based upon the stability rate of the external sensor and the dispersion thereof which are recorded in the past information T10 satisfies a continuation condition of the autonomous control of the moving object 1 (S106).

The stability rate of detection is set when the detection of the same object is unstable. That is, when hunting occurs, or the same object is seen or not seen depending on the day even under the same condition, the stability rate is set to a small value. As the number of sensors having the high stability rate of the detection and the small dispersion value of a sensor detection result is larger, the external information detection accuracy is set to be higher.

When there exists a movement plan candidate whose detection accuracy is equal to or greater than the threshold value Th2 (S106: YES), the movement plan selection unit 130 selects the movement plan candidate as the movement plan of the execution target, and then outputs the selected movement plan candidate to the control unit 104 (S108). When there exist a plurality of movement plan candidates satisfying step S106, a movement plan candidate that satisfies the action goal having high priority may be selected. Alternatively, a movement plan candidate having higher accuracy may be selected.

In all the movement plan candidates generated in step S102, when the accumulation of the number of data is greater than the threshold value Th1 (S104: NO) and the detection accuracy of the external information is smaller than the threshold value Th2 (S106: NO), a route having the low external information detection accuracy is included therein regardless of which movement plan candidate is selected. Here, the movement plan selection unit 130 selects a movement plan candidate which is estimated to have the highest detection accuracy as the movement plan of the execution target from among the movement plan candidates whose detection accuracy of the external information is low (S109).

The movement plan selection unit 130 determines whether or not the external information detection accuracy is predicted to be lowered to such an extent as to lower a control level for safety below a threshold value Th3 in the movement plan selected in step S109 based upon the past information T10 (S110).

When the control level is predicted to be lowered (S110: YES), the moving object controller 100 outputs an alert before the control level is lowered, and calls user's attention (S111). Accordingly, the user can cope with the deterioration of the control level with sufficient time. When "NO" is determined in step S110, the process is terminated without outputting the alert.

Further, even in steps S107 and S109, when the external information detection accuracy is lowered to such an extent as to lower the control level for safety, the moving object controller 100 lowers the control level.

FIG. 5 is an explanatory diagram illustrating a state of selecting the movement plan of the execution target from among the movement plan candidates, based upon the detection accuracy Sa (the stability rate and the dispersion value) of the external information and the accumulation amount Dp (the value of the number of data C107) of the past information.

In FIG. 5, a case in which the number of data C107(Dp) collected in the past with respect to the external sensor is equal to or smaller than the threshold value Th1 is defined as a first region. A case in which the number of data C107(Dp) is greater than the threshold value Th1 and the detection accuracy Sa is equal to or greater than the threshold value Th2 is defined as a second region. A case in which the number of data C107(Dp) is greater than the threshold value Th1 and the detection accuracy Sa is smaller than the threshold value Th2 is defined as a third region.

As described in the flowchart in FIG. 3, in the first region, one movement plan of the execution target is selected from among the movement plan candidates whose number of data C107(Dp) is equal to or smaller than the threshold value Th1 (S104: YES, S105). In the second region, one movement plan of the execution target is selected from among the movement plan candidates whose detection accuracy Sa of the external information is equal to or greater than the threshold value Th2 (S106: YES, S108). In the third region, one movement plan of the execution target is selected from among the movement plan candidates whose detection accuracy Sa of the external information is the highest (S106: NO, S109).

Since the embodiment is provided with the above-described configuration, information can be efficiently acquired by preferentially performing the selection from the movement plan candidates whose number of data is not sufficient enough when performing the estimation of the external information detection accuracy.

Even on the same route, a road condition, a traffic environment, and the like vary in various manners depending on a season, weather, time, a traffic congestion degree, and the like. Therefore, it is desirable to accumulate new information as much as possible under various circumstances in the past information T10.

FIG. 6 is a block diagram of a moving object control system 10A according to a modified example of the embodiment. In comparison with the moving object control system 10 illustrated in FIG. 1, a moving object controller 100A of the system 10A according to the modified example is provided with an external information detection accuracy calculation unit 140 and the past information accumulation unit 150, and the past information acquisition unit 103 is not connected thereto. The reason is that the past information accumulation unit 150 is provided instead of the past information acquisition unit 103.

The external information detection accuracy calculation unit 140 has a function of calculating the detection accuracy of the external information. Respective information from the external information acquisition unit 101 and the internal information acquisition unit 102 is inputted to the external information detection accuracy calculation unit 140.

In addition to the above-described method, the external information detection accuracy calculation unit 140 may calculate the detection accuracy of the external information from the internal information (including a control command, actual motor torque, and the like) of the moving object 1 and the external information (including failure determination information of the external sensor itself) thereof.

The external information detection accuracy may be, for example, a sensor failure (fault) rate per distance, or may be represented by the magnitude of an error between a movement amount of the moving object calculated from the internal information and a movement amount thereof calculated from the external sensor information.

The past information accumulation unit 150 stores the external information detection accuracy calculated by the external information detection accuracy calculation unit 140, and the external information and internal information at that time in the internal memory (not illustrated) in such a manner that the external information detection accuracy estimation unit 120 can refer thereto. According to the configuration illustrated in FIG. 6, the information on the collected external information detection accuracy can be referred to in subsequent control, and the control for selecting the movement plan whose external information detection accuracy is the highest can be efficiently performed according to a movement condition.

In the embodiment, since the moving object 1 can move on the route whose past information is small, information on the route can be efficiently collected. Accordingly, the detection accuracy of the external information with respect to the movement route can be gradually improved. As a result, when the detection accuracy of the external information becomes equal to or greater than the threshold value Th2, the moving object 1 can select the route whose detection accuracy of the external information is high and move thereon, thereby improving the reliability and usability.

Second Embodiment

A second embodiment will be described with reference to FIGS. 7 and 8. In each of the following embodiments including the embodiment, a difference from the first embodiment will be mainly described. In the embodiment, a method of referring to a user request will be described at the time of selecting a movement plan.

FIG. 7 illustrates a control block diagram of a moving object control system 10B according to the embodiment. The difference from the first embodiment is that a user request acquisition unit 160 is provided. The user request acquisition unit 160 has a function of acquiring a user request indicating what a user desires to obtain as a control result of the moving object 1.

The user can select any one of a plurality of modes prepared in advance and can give an instruction to a moving object controller 100B. In the embodiment, there exist a plurality of modes such as, for example, an external information detection accuracy investigation mode, a required time shortening mode, a favorite mode for incorporating a user favorite route, and an energy efficiency optimization mode.

The external information detection accuracy investigation mode is a mode for investigating the detection accuracy of the external information by using the moving object 1 used by the user, that is, a mode for selecting a movement plan in which the moving object 1 is used as a probe car. The external information detection accuracy investigation mode corresponds to a "main mode".

The required time shortening mode is a mode for selecting a movement plan that shortens time required for the movement of the moving object 1, and corresponds to a "sub-mode" or a "first sub-mode". The favorite mode is a mode for selecting a movement plan closest to a movement plan desired by the user, and corresponds to a "sub-mode" or a "second sub-mode". The energy efficiency optimization mode is a mode for selecting a movement plan that optimizes energy efficiency at the time of the movement of the moving object 1, and corresponds to a "sub-mode" or a "third sub-mode".

The user can select a desired mode from among the plurality of modes prepared in advance and set a high priority to the desired mode. Accordingly, it is possible to increase an opportunity of selecting the movement plan that satisfies the mode desired by the user.

A movement plan selection process according to the embodiment will be described with reference to a flowchart in FIG. 8. In the same manner as that of the first embodiment, the movement plan generation unit 110 of the moving object controller 100B acquires the external information and the internal information (S101), and creates a candidate for the movement plan (S102). The external information detection accuracy estimation unit 120 acquires past information similar to the movement plan candidate from the past information acquisition unit 103 (S103).

The user request acquisition unit 160 acquires information on a priority order indicating which mode the user puts the priority to (S200). The information on the priority order of the user request also includes, for example, information on the movement efficiency of the moving object 1 such as required time, energy efficiency, and the like, and information on the user's preference, and the like for the movement plan. For example, the user's preference is a desire to move on a route having as few traffic signals as much as possible, a desire to move on a route where there is a store of a type of industry designated by the user such as a restaurant, a coffee shop, and the like along a roadside, and a desire to move on a route along the coast as much as possible.

The priority order of the user request can be inputted to the moving object controller 100B by the user via a user interface device such as a keyboard and a touch panel. For example, the user can input information such as the priority order, and the like from a portable information terminal, and the like in such a manner that the portable information terminal and a cellular phone (including a so-called smart phone) owned by the user is connected to the moving object controller 100B wirelessly or by wire. The information may be inputted manually, or may be inputted by voice. Alternatively, the past history of the user request may be managed, the history may be analyzed, and the priority order of the user request may be also automatically estimated.

The movement plan selection unit 130 determines whether or not a first user request is the external information detection accuracy investigation mode (S201). When determining that the first user request is the external information detection accuracy investigation mode (S201: YES), the movement plan selection unit 130 selects a movement plan that satisfies the external information detection accuracy investigation mode, and the detection accuracy of the external information is investigated based upon the movement plan (S104 to S109).

When the first user request is not the external information detection accuracy investigation mode (S201: NO), the movement plan selection unit 130 determines whether or not the first user request is the required time shortening mode that indicates shortening of the required time up to a destination (or a target state) (S202).

When determining that the first user request is the required time shortening mode (S202: YES), the movement plan selection unit 130 calculates the required time for each of the plurality of movement plan candidates created in step S102 (S203). The required time can be calculated from, for example, a distance up to the destination, allowable acceleration and deceleration of the moving object 1, and the like.

In a case where another moving object exists on the movement plan, when speed information of another moving object can be acquired via inter-vehicle communication and road-to-vehicle communication, the required time may be calculated from the speed information of another moving object and the distance up to the destination.

The movement plan selection unit 130 selects a movement plan candidate whose required time is the shortest as the movement plan of the execution target from the calculation result in step S203 (S204).

When the first user request is not the required time shortening mode (S202: NO), the movement plan selection unit 130 determines whether or not the first user request is the favorite mode for selecting a favorite plan (S205). The favorite plan is a movement plan that the user desires to adopt regardless of the required time and the energy efficiency. For example, in automatic driving, if a driver likes a road on which the sea can be seen, a movement plan including the road on which the sea can be seen is set as the favorite plan. In a drone mounted with a camera, a movement plan in which scenery desired to be photographed by the user is easy to be captured is set as the favorite plan. When there exists a route that the user often uses because a view is good and a traffic accident is hard to occur, a movement plan passing through the route may be also set as the favorite plan.

When the first user request is the favorite mode (S205: YES), the movement plan selection unit 130 calculates similarity between each movement plan candidate and the favorite plan according to the following equation (1).

$$\text{Pref}(j) = \Sigma_i \int WP_i \text{Pref}_{ij}(x) dx \quad (1)$$

Here, Pref(j) is the similarity between the j-th movement plan (the route) and the favorite plan. $WP_i$ is a weighting coefficient indicating the strength of preference of the i-th favorite element (the sea can be seen, the accident occurrence is small, and the like). $\text{Pref}_{ij}(x)$ returns 1 when the i-th favorite element exists, or returns 0 when the i-th favorite element does not exist at a position of a distance x on the j-th route. When the strength of the preference is not clear, $WP_i$ is calculated as $WP_i=1$.

The movement plan selection unit 130 selects a movement plan candidate whose value of Pref(j) calculated in step S206 is the greatest as the movement plan of the execution target (S207).

When the first user request is not the favorite mode (S205: NO), the movement plan selection unit 130 selects the energy efficiency optimization mode, and calculates the energy efficiency of each movement plan candidate, that is, a ratio of a movement distance with respect to an energy amount that is considered to be consumed when the movement plan is executed (S208).

The movement plan selection unit 130 selects a movement plan candidate whose energy efficiency calculated in step S208 is the highest as the movement plan of the execution target (S209).

After the selection of the movement plan, the moving object controller 100B determines whether or not the external information detection accuracy is predicted to be lowered to such an extent as to lower a control level for safety in the selected movement plan (S110). When the control level is predicted to be lowered, the user's attention is called in advance (S111).

The embodiment configured as described above also has the same action effect as that of the first embodiment. Further, in the embodiment, the user can give the high priority order to a desired mode from among the plurality of modes prepared in advance. Accordingly, in the embodiment, it is possible to appropriately obtain a secondary effect that the user desires to obtain through the control of the moving object 1.

For example, it is possible to obtain desired secondary effects at the time of the movement such as a desire to contribute to the reliability improvement of autonomous movement by performing investigation on the external information detection accuracy at the time of the movement (the external information detection accuracy investigation mode); a desire to arrive at a destination as soon as possible (the required time shortening mode); a desire to move pleasantly through a route according to his or her preference even though the user makes a little detour (the favorite mode); and a desire to save energy consumption as much as possible (the energy efficiency optimization mode).

Third Embodiment

A third embodiment will be descried with reference to FIG. 9. In the embodiment, when the movement plan is selected on the basis of the user request, the mode is not selected only in the priority order designated by the user, but is arbitrated on the basis of an allowable amount set for each mode.

FIG. 9 is a flowchart of a movement plan selection process according to the embodiment. The movement plan generation unit 110 acquires the external information and the internal information (S101), and creates a movement plan candidate (S102). The external information detection accuracy estimation unit 120 acquires the past information similar to the movement plan candidate (S103).

The movement plan selection unit 130 respectively calculates the required time, the similarity to the favorite plan, and the energy efficiency for each movement plan candidate (S300).

The movement plan selection unit 130 acquires the user request (the priority order to each mode) and an allowable value of each mode (S301). The allowable value of each mode is, for example, an allowable upper limit value of the required time up to the destination, an allowable lower limit value of the similarity to the favorite plan, and an allowable lower limit value of the energy efficiency. As described in the input method of the user request, the user may input the allowable value by using a keyboard, a touch panel, or a means such as a voice input, and the like, or the allowable value may be estimated by analyzing the past history of the user request and the allowable value.

The movement plan selection unit 130 determines whether or not there exists a movement plan candidate that falls within the allowable values for all the modes among the respective movement plan candidates (S302). When finding the movement plan candidate that falls within allowable ranges for all the modes (S302: YES), the movement plan selection unit 130 extracts only the movement plan candidate whose all modes fall within the allowable values as an effective movement plan, and the process proceeds to step S104.

Thereafter, the processes from steps S104 to S109 are executed, and the detection accuracy of the external information is investigated. Accordingly, in the embodiment, the external information detection accuracy investigation mode becomes effective only in a situation in which a required time shortening request and an energy efficiency optimization request are satisfied. Therefore, the user does not feel troublesome, and the like, thereby improving the usability.

On the other hand, when any movement plan candidate exceeds the allowable value in any one or more modes (S302: NO), the movement plan selection unit 130 calculates an amount deviating from the allowable value for each movement plan candidate according to the following equation (2).

$$\mathrm{Dev}(j) = \Sigma W_i D_{ij} \qquad (2)$$

Dev(j) indicates a deviation amount from the user request of the j-th movement plan candidate; $W_i$ indicates a weight coefficient that represents the user priority with respect to the i-th mode; and $D_{ij}$ indicates a deviation amount from an allowable value of the mode i when the j-th movement plan candidate is executed.

The movement plan selection unit 130 selects a movement plan candidate whose Dev(j) calculated in step S304 is the smallest as the movement plan of the execution target (S305).

After the selection of the movement plan, it is determined whether or not the external information detection accuracy is predicted to be lowered to such an extent as to lower the control level for safety (S110). When it is predicted that the control level is lowered than the threshold value Th3 (S110: YES), the user's attention is called in advance (S111).

The embodiment configured as described above also has the same action effect as that of the first embodiment. Further, in the embodiment, when there exist a plurality of secondary effects that the user desires to obtain and there exists no great difference in request degrees of the secondary effects, the user request can be satisfied in a well-balanced manner. Accordingly, the usability and satisfaction of the user are improved in the embodiment.

Fourth Embodiment

A fourth embodiment will be descried with reference to FIGS. 10 to 12. In the embodiment, an incentive to participate in the investigation of the detection accuracy of the external information is given to the moving object 1 or a user thereof.

FIG. 10 is a block diagram of a moving object control system 10C according to the embodiment. In comparison with the configuration described in FIG. 7, the moving object control system 10C according to the embodiment is provided with an investigation action determination unit 170 and a communication permission unit 180.

The movement plan selection unit 130 of a moving object controller 100C acquires the user request from the user request acquisition unit 160, and selects the movement plan according to whether or not the user permits the selection of the external information detection accuracy investigation mode.

The investigation action determination unit 170 determines whether or not the selection of the external information detection accuracy investigation mode is canceled, based upon the user request acquired from the user request acquisition unit 160 and the movement plan acquired from the movement plan selection unit 130. That is, it is determined whether or not the user intends to participate in the investigation of the detection accuracy of the external information.

FIG. 11 is a flowchart of a movement plan selection process according to the embodiment. The movement plan generation unit 110 acquires the external information and the internal information (S101), and generates the candidate of the movement plan (S102).

The investigation action determination unit 170 determines whether or not the selection of the movement plan according to the external information detection accuracy investigation mode is permitted (S401). A determination result of the investigation action determination unit 170 is inputted to the communication permission unit 180.

When the detection accuracy investigation of the external information is permitted (S401: YES), the communication permission unit 180 permits the external information detection accuracy estimation unit 120 to access and acquire the past information (S402). Accordingly, a series of processes described in steps S103 to S111 can be executed (S403).

On the other hand, when the detection accuracy investigation of the external information is not permitted (S401: NO), the communication permission unit 180 prohibits the external information detection accuracy estimation unit 120 from accessing and acquiring the past information (S404). Thereafter, the processes of steps S202 to S209 described in FIG. 8 or the processes of steps S300 to S305 described in FIG. 9 are executed.

A process of controlling a content of the movement plan according to a degree of contribution to the investigation of the external information detection accuracy will be described with reference to a flowchart in FIG. 12. In the following description, the degree of contribution as an "actual result index" is represented as an external information detection accuracy investigation action index RA.

The moving object controller 100 reads out external information detection accuracy Uc(x) experienced by himself or herself (an own vehicle, an own moving object) from a memory within a predetermined time from a current point of time or within a predetermined distance from a current position (S501). That is, in step S501, comparatively recent external information detection accuracy is acquired. This is because it is considered that as the external information detection accuracy is the latest one, the reliability thereof is higher and the contribution to a system that autonomously moves by using the past information is higher.

The moving object controller 100 calculates an integrated value RA of the external information detection accuracy Uc(x) acquired in step S501 (S502). The magnitude of the integrated value RA indicates a height of a ratio of performing the external information detection accuracy investigation action. Therefore, the integrated value RA indicates an actual result of participating in the investigation of the detection accuracy of the external information, and can be represented as the external information detection accuracy investigation action index RA. Hereinafter, the integrated value RA may be referred to as the RA value and the external information detection accuracy investigation action index RA may be referred to as the index RA.

The moving object controller 100 exchanges the mutual RA values with a moving object controller of another surrounding moving object (S503). In step S503, a predetermined part of the mutual movement plans is also exchanged. Exchanging the predetermined part means partially exchanging the movement plan within a range used to adjust the movement plan between the moving objects.

The moving object controller 100 determines whether or not its own RA value is greater than a RA value of another moving object (S504). When its own RA value is greater than the RA value of another moving object (S504: YES), its own movement plan is prioritized over the movement plan of another moving object and the execution is continued (S505). On the other hand, when its own RA value is smaller than the RA value of another moving object (S504: NO), its own movement plan is changed so as to put the priority on the movement plan of another moving object (S506).

Further, as described above, the movement plan based upon the RA value can also be arbitrated between the moving object controllers 100 of the respective moving objects, alternatively, the movement plan can also be arbitrated in the data management system 2. In this case, the moving object controllers 100 of the respective moving objects respectively transmit the RA value and the movement plan to the data management system 2; the data management system 2 arbitrates the movement plan between the respective moving objects based upon the magnitude, and the like of the RA value; the movement plan is corrected if necessary; and the corrected movement plan may be transmitted to the corresponding moving object controller 100.

The arbitration of the movement plan based upon the RA value may be executed only when the traffic environment and the like are under a predetermined condition. As the predetermined condition, for example, the arbitration is performed in a specific route section; the arbitration is performed in a specific time zone; the arbitration is performed in a specific weather condition; and the arbitration is performed when the number of surrounding moving objects is equal to or greater than a predetermined value or equal to or smaller than the predetermined value.

Further, the data management system 2 may determine the investigation action of each moving object 1 instead of providing the investigation action determination unit 170 in the moving object 1. Then, information for identifying the moving object 1 or the user and the RA value may be transmitted to the cooperative service management system 3 from the data management system 2. The cooperative service management system 3 can provide another service to the moving object 1 or the user thereof based upon the RA value. For example, a charging service, a parking service, and the like are preferentially provided to the moving object 1 whose RA value is great, or an insurance service and services such as a hotel service and a restaurant service, and the like may be provided under an advantageous condition to the user of the moving object whose RA value is great.

The embodiment configured as described above also has the same action effect as that of the first embodiment. Further, in the embodiment, it is possible to arbitrate the movement plan between the moving object (and/or the user thereof) contributing to the investigation of the detection accuracy of the external information and another moving object based upon the RA value which is the index indicating the degree of contribution. Accordingly, in the embodiment, as the degree of contribution is great, it is possible to move with an initial movement plan as it is without being affected by the movement plan of another moving object, thereby improving the user's convenience. As a result, an incentive can be given to the user with respect to the participation in the investigation of the detection accuracy of the external information, and inconvenience accompanying the investigation can be offset.

Further, whether or not to provide any merit to the user may be determined not only by a recent investigation action but also by an actual result of a past investigation action. The determination of the merit based upon the actual result of the past investigation action means that, for example, when a ratio of traveling time (or a distance) that permits the investigation action of the external information detection accuracy with respect to past traveling time (or a distance) is equal to or greater than a predetermined value, the use of past information is permitted.

Fifth Embodiment

A fifth embodiment will be described with reference to FIG. 13. In the embodiment, the actual result of the investigation action of the external information detection accuracy is also managed in association with the user. As illustrated in an overall system diagram in FIG. 13, in the embodiment, moving object monitoring information T20 is transmitted from the moving object controller 100 of each moving object 1 to the data management system 2.

For example, the moving object monitoring information T20 includes moving object identification information (hereinafter, referred to as a moving object ID) C201 for identifying the moving object 1; user identification information (hereinafter, referred to as a user ID) C202 for identifying a user U; and monitor data C203 related to the movement of the moving object 1. The monitor data C203 can include, for example, the priority order of the mode, the detection accuracy of the external information, and the like.

The data management system 2 manages the moving object monitoring information T20 collected from each moving object 1, and calculates the RA value, and the like. Even when the user U transfers from a certain moving object 1(1) to another moving object 1(n), the RA value is taken over by the user. That is, a RA value obtained by the user in the moving object 1(1) and a RA value obtained by the user in another moving object 1(n) are added up and used as the contribution degree of the user.

The embodiment configured as described above also has the same action effect as that of the first embodiment. Further, in the embodiment, the contribution degree (the RA value) related to the investigation of the detection accuracy of the external information is managed in association with the user. For this reason, in the embodiment, even when the user uses a plurality of moving objects 1, the contribution degree of the user can be appropriately managed, thereby improving the usability of the user.

Sixth Embodiment

A sixth embodiment will be described with reference to FIGS. 14 and 15. In the embodiment, an example of providing a predetermined service managed by the cooperative service management system 3 to the moving object 1 (and/or the user) will be described.

FIG. 14 is an example of providing a charging service as the "predetermined service". In FIG. 14, a robot or an industrial machine is taken as an example of the moving object 1.

As illustrated in FIG. 14(a), a plurality of moving objects 1(2) to 1(4) form a row in front of a charger 4. The foremost moving object 1(2) is in process of charging and other moving objects 1(3) and 1(4) are waiting for charging.

When the moving object 1(1) arrives there, the moving object 1(1) exchanges the contribution degree (the RA value) related to the investigation of the detection accuracy of the external information with the moving objects 1(3) and 1(4) waiting for charging, and compares the contribution degrees with each other. Here, it is assumed that the contribution degree of the moving object 1(1) is higher than the contribution degree of other moving objects 1(3) and 1(4).

As illustrated in FIG. 14(b), the moving object 1(1) having a high contribution degree is added to a line waiting for the charger 4 in preference to the moving objects 1(3) and 1(4). Accordingly, the moving object 1(1) can receive the charging service in a shorter time in comparison with a case where the moving object 1(1) waits for charging on the first come first served basis.

FIG. 15 illustrates a priority passage of a gate 3 as an example of the "predetermined service". For example, the gate 3 such as a tollgate, and the like is provided with a general gate 31 and a priority gate 32.

The moving object 1(1) whose contribution degree (the RA value) is equal to or greater than a predetermined threshold value moves on a priority lane and passes through the priority gate 32. The moving objects 1(2) to 1(4) whose contribution degree is smaller than the predetermined threshold value move on a general lane and pass through the general gate. Accordingly, the moving object 1(1) whose contribution degree is high can pass through the gate 3 earlier than other moving objects 1(2) to 1(4) whose contribution degree is low, thereby improving the user's usability.

Further, a case in which the service is preferentially used according to the contribution degree of the moving object 1(1) has been described, however, as described above, since the contribution degree can also be managed in association with the user, the service can be preferentially used according to the contribution degree of the user.

Seventh Embodiment

A seventh embodiment will be described. In the embodiment, steps S106 and S108 described in FIG. 3 are given priority over steps S104, S105, and S107. That is, in the embodiment, when there exists a movement plan whose external information detection accuracy satisfies a continuation condition of the autonomous control of the moving object 1 (S106: YES), the movement plan is selected as the movement plan of the execution target (S108).

When there does not exist the movement plan whose external information detection accuracy satisfies the continuation condition of the autonomous control of the moving object 1 (S106: NO), it is determined whether or not there exists a movement plan candidate whose number of past similar data C107 is equal to or smaller than the predetermined threshold value Th1 (S104). When finding the movement plan candidate whose number of data C107(Dp) is equal to or smaller than the threshold value Th1 (S104: YES), the movement plan selection unit 130 selects the movement plan candidate as the movement plan of the execution target, and then outputs the selected movement plan to the control unit 104 (S105). While the moving object 1 is moving based upon the movement plan selected in step S105, data detected in the external sensor group and the internal sensor group are collected and accumulated.

The embodiment configured as described above also has the same action effect as that of the first embodiment. In the embodiment, the movement plan whose detection accuracy of the external information is estimated to be equal to or greater than the threshold value Th1 is preferentially selected, however, the user sets the priority order of the external information detection accuracy investigation mode to be higher.

Further, the present invention is not limited to the above-described embodiments, but includes various modified examples. The embodiments are described in detail in order to describe the present invention in an easy-to-understand manner, and are not necessarily limited to those including all the above-described configurations. Further, a part of the configuration of one embodiment can be replaced with the configuration of another embodiment. Further, the configuration of another embodiment can also be added to the configuration of one embodiment. In addition, another configuration can also be added, deleted, and replaced with respect to a part of the configuration of each embodiment.

Further, the technical features included in the above-described embodiments are not limited to the combinations specified in the scope of the claims, and can be appropriately combined. It is also possible to combine one embodiment described above with another embodiment and to use the combined embodiment.

REFERENCE SIGNS LIST

1: moving object
2: data management system
3: cooperative service management system
10, 10A, 10B, 10C: moving object control system
100, 100A, 100B, 100C: moving object controller
101: external information acquisition unit
102: internal information acquisition unit
103: past information acquisition unit
104: control unit
110: movement plan generation unit
120: external information detection accuracy estimation unit
130: movement plan selection unit
140: external information detection accuracy calculation unit
150: past information accumulation unit
160: user request acquisition unit
170: investigation action determination unit
180: communication permission unit

The invention claimed is:

1. A moving object controller that controls a moving object, comprising:
    a processor and a memory, the memory storing instructions that when executed by the processor configure the processor to:
    generate at least one movement plan based upon external information on an external world of a moving object and internal information on an internal part of the moving object,
    estimate detection accuracy of the external information for each of a plurality of records based upon the external information, the internal information, and predetermined past information, among the generated movement plans, the estimated detection accuracy indicating respective accuracies of a plurality of sensors of a moving object, and
    upon determining there is no movement plan whose statistical value is equal to or smaller than a predetermined threshold value for a statistical value of the predetermined past information, select a movement plan whose estimated accuracy of at least one sensor is equal to or greater than a predetermined threshold value among the generated movement plans as the movement plan of the execution target.

2. The moving object controller according to claim 1, wherein
    the predetermined past information includes past external information, past internal information, and accuracy information estimated for the past external information.

3. The moving object controller according to claim 1, wherein
    wherein the processor is configured to: upon determining there is no movement plan whose estimated accuracy is equal to or greater than the predetermined threshold value for the accuracy, select a movement plan whose estimated accuracy is the highest as the movement plan of the execution target.

4. The moving object controller according to claim 1,
    wherein the processor is configured to acquire a user request related to a moving object control method,
    wherein the user request indicates a selection of either one of a main mode in which a movement plan of the execution target is selected from among the generated movement plans based upon the statistical value of the predetermined past information and a sub-mode other than the main mode, and
    wherein when the user request indicates a selection of the main mode, use of the predetermined past information is permitted, and when the user request indicates selection of the sub-mode, the use of the predetermined past information is prohibited.

5. The moving object controller according to claim 4, wherein
    the sub-mode includes at least one of a first sub-mode that indicates a selection of a movement plan whose required time for movement is the shortest; a second sub-mode that indicates a selection of a movement plan closest to a desired movement plan designated in advance by a user; and a third sub-mode that indicates a selection of a movement plan whose energy efficiency required for the movement is the highest, among the generated movement plans.

6. The moving object controller according to claim 4, wherein
    an allowable value for permitting selection is preset in the sub-mode, and
    wherein the processor is configured to, when the user request indicates a selection of the sub-mode, select the movement plan of the execution target from among the generated movement plans based upon the allowable value.

7. The moving object controller according to claim 4, wherein
    wherein the processor is configured to control a priority relationship between the movement plan of the execution target and a movement plan of another moving object based upon an actual result index indicating an actual result in which the movement plan whose statistical value is equal to or smaller than the predetermined threshold value for the statistical value is selected as the movement plan of the execution target.

8. The moving object controller according to claim 4, wherein
    user identification information for identifying the user of the moving object and the actual result index are associated with each other and stored in a data management system.

9. The moving object controller according to claim 4, wherein
    a predetermined service provided from a predetermined service management system is used, based upon an actual result index indicating an actual result in which the movement plan whose statistical value is equal to or smaller than the predetermined threshold value for the statistical value is selected as the movement plan of the execution target.

10. A moving object control method that controls a moving object by a computer, comprising:
    generating, by the computer, at least one movement plan based upon external information on an external world of a moving object and internal information on an internal part of the moving object;
    estimating, by the computer, detection accuracy of the external information, for each of a plurality of records, based upon the external information, the internal information, and predetermined past information, among the generated movement plans, the estimated detection accuracy indicating respective accuracies of a plurality of sensors of a moving object; and
    upon determining there is no movement plan whose statistical value is equal to or smaller than a predetermined threshold value for a statistical value of the predetermined past information, selecting a movement plan whose estimated accuracy of at least one sensor is equal to or greater than a predetermined threshold value among the generated movement plans as the movement plan of the execution target.

* * * * *